(12) United States Patent
Lewis et al.

(10) Patent No.: US 8,047,282 B2
(45) Date of Patent: Nov. 1, 2011

(54) METHODS OF SONICALLY ACTIVATING CEMENT COMPOSITIONS

(75) Inventors: Sam Lewis, Duncan, OK (US); Priscilla Reyes, Duncan, OK (US); Vijay Gupta, Morrisville, NC (US); Brian R. Stoner, Chapel Hill, NC (US); Anthony Badalamenti, Katy, TX (US)

(73) Assignee: Halliburton Energy Services Inc., Duncan, OK (US)

( * ) Notice: Subject to any disclaimer, the term of this patent is extended or adjusted under 35 U.S.C. 154(b) by 248 days.

(21) Appl. No.: 12/547,281

(22) Filed: Aug. 25, 2009

(65) Prior Publication Data

US 2011/0048711 A1    Mar. 3, 2011

(51) Int. Cl.
*E21B 33/13*  (2006.01)
*E21B 33/138* (2006.01)

(52) U.S. Cl. ............. 166/249; 166/177.1; 166/177.2; 166/286; 166/292; 166/293; 166/295

(58) Field of Classification Search ........... 166/177.1, 166/177.2, 286
See application file for complete search history.

(56) References Cited

U.S. PATENT DOCUMENTS

| | | | | |
|---|---|---|---|---|
| 2,072,982 A * | 3/1937 | Dale | ............ | 166/286 |
| 3,130,552 A * | 4/1964 | Bodine, Jr. | ........ | 405/266 |
| 3,239,005 A * | 3/1966 | Bodine, Jr. | ........ | 166/286 |
| 4,093,028 A * | 6/1978 | Brandon | ........ | 166/281 |
| 4,512,401 A | 4/1985 | Bodine | | |
| 4,653,587 A | 3/1987 | Bodine | | |
| 4,658,897 A * | 4/1987 | Kompanek et al. | ........ | 166/249 |
| 4,736,794 A | 4/1988 | Bodine | | |
| 5,029,645 A * | 7/1991 | Allen | ............ | 166/286 |
| 5,261,492 A | 11/1993 | Duell et al. | | |
| 5,277,253 A | 1/1994 | Giroux et al. | | |
| 5,368,103 A | 11/1994 | Heathman et al. | | |
| 5,377,753 A * | 1/1995 | Haberman et al. | ........ | 166/249 |
| 5,437,329 A | 8/1995 | Brooks et al. | | |
| 5,566,757 A | 10/1996 | Carpenter et al. | | |
| 5,829,522 A | 11/1998 | Ross et al. | | |
| 6,457,524 B1 | 10/2002 | Roddy | | |
| 6,739,806 B1 | 5/2004 | Szymanski et al. | | |
| 6,868,908 B2 | 3/2005 | Badalamenti | | |
| 6,973,969 B2 | 12/2005 | Roddy et al. | | |

(Continued)

FOREIGN PATENT DOCUMENTS

GB    2391565    2/2004

(Continued)

OTHER PUBLICATIONS

"Ultrasound-Enhanced Polymer Degradation and Release of Incorporated Substances" Proc. Natl. Acad. Sci. USA 1989, vol. 86, pp. 7663-7666.

(Continued)

*Primary Examiner* — George Suchfield
(74) *Attorney, Agent, or Firm* — Craig W. Roddy; Fish & Richardson

(57) ABSTRACT

The present disclosure is directed to a system and method for sonically activating cement slurries. In some implementations, a method of treating a subterranean formation includes positioning a settable composition including a capsule in a wellbore. The capsule is used to increase a setting rate in response to at least sonic signals. A sonic signal is transmitted to at least a portion of the settable composition to release an activator from the capsule.

38 Claims, 19 Drawing Sheets

U.S. PATENT DOCUMENTS

| | | | |
|---|---|---|---|
| 6,978,834 B1 | 12/2005 | Chatterji et al. |
| 6,982,000 B2 | 1/2006 | Chatterji et al. |
| 7,036,586 B2 | 5/2006 | Roddy et al. |
| 7,067,000 B1 | 6/2006 | Szymanski et al. |
| 7,077,203 B1 | 7/2006 | Roddy et al. |
| 7,086,466 B2 | 8/2006 | Roddy |
| 7,150,322 B2 | 12/2006 | Szymanski et al. |
| 7,156,174 B2 | 1/2007 | Roddy et al. |
| 7,159,659 B2 | 1/2007 | Welton et al. |
| 7,174,962 B1 | 2/2007 | Roddy et al. |
| 7,191,834 B2 | 3/2007 | Lewis et al. |
| 7,199,086 B1 | 4/2007 | Roddy et al. |
| 7,204,307 B2 | 4/2007 | Roddy et al. |
| 7,204,310 B1 | 4/2007 | Roddy et al. |
| 7,204,312 B2 | 4/2007 | Roddy et al. |
| 7,213,646 B2 | 5/2007 | Roddy et al. |
| 7,240,732 B2 | 7/2007 | Lewis et al. |
| 7,252,147 B2 | 8/2007 | Badalamenti et al. |
| 7,258,738 B2 | 8/2007 | Lewis et al. |
| 7,273,949 B2 | 9/2007 | Lewis et al. |
| 7,284,608 B2 | 10/2007 | Reddy et al. |
| 7,284,609 B2 | 10/2007 | Roddy et al. |
| 7,290,611 B2 | 11/2007 | Badalamenti et al. |
| 7,293,609 B2 | 11/2007 | Dealy et al. |
| 7,293,941 B2 | 11/2007 | Lewis et al. |
| 7,299,874 B2 | 11/2007 | Welton et al. |
| 7,303,008 B2 | 12/2007 | Badalamenti et al. |
| 7,303,014 B2 | 12/2007 | Reddy et al. |
| 7,303,019 B2 | 12/2007 | Welton et al. |
| 7,322,412 B2 | 1/2008 | Badalamenti et al. |
| 7,335,252 B2 | 2/2008 | Roddy et al. |
| 7,337,842 B2 | 3/2008 | Roddy et al. |
| 7,338,923 B2 | 3/2008 | Roddy et al. |
| 7,341,104 B2 | 3/2008 | Roddy |
| 7,350,575 B1 | 4/2008 | Lewis et al. |
| 7,353,870 B2 | 4/2008 | Roddy et al. |
| 7,360,598 B1 | 4/2008 | Lewis et al. |
| 7,381,263 B2 | 6/2008 | Roddy et al. |
| 7,387,675 B2 | 6/2008 | Roddy et al. |
| 7,388,045 B1 | 6/2008 | Lewis et al. |
| 7,389,815 B2 | 6/2008 | Badalamenti et al. |
| 7,395,860 B2 | 7/2008 | Roddy et al. |
| 7,399,355 B2 | 7/2008 | Szymanski et al. |
| 7,401,646 B2 | 7/2008 | Badalamenti et al. |
| 7,404,440 B2 | 7/2008 | Reddy et al. |
| 7,409,991 B2 | 8/2008 | Reddy et al. |
| 7,424,913 B2 | 9/2008 | Roddy |
| 7,431,086 B2 | 10/2008 | Lewis et al. |
| 7,445,669 B2 | 11/2008 | Roddy et al. |
| 7,445,670 B2 | 11/2008 | Lewis et al. |
| 7,451,817 B2 | 11/2008 | Reddy et al. |
| 7,478,675 B2 | 1/2009 | Roddy et al. |
| 7,503,399 B2 | 3/2009 | Badalamenti et al. |
| 7,523,784 B2 | 4/2009 | Lewis et al. |
| 7,576,040 B2 | 8/2009 | Lewis et al. |
| 7,576,042 B2 | 8/2009 | Lewis et al. |
| 7,607,482 B2 | 10/2009 | Roddy et al. |
| 7,607,484 B2 | 10/2009 | Roddy et al. |
| 7,617,870 B1 | 11/2009 | Roddy et al. |
| 7,621,336 B2 | 11/2009 | Badalamenti et al. |
| 7,621,337 B2 | 11/2009 | Badalamenti et al. |
| 7,631,692 B2 | 12/2009 | Roddy et al. |
| 7,636,671 B2 | 12/2009 | Caveny et al. |
| 2003/0221831 A1 | 12/2003 | Reddy et al. |
| 2004/0047534 A1 | 3/2004 | Shah et al. |
| 2004/0180793 A1 | 9/2004 | Ramos et al. |
| 2005/0006020 A1 | 1/2005 | Jose Zitha et al. |
| 2005/0139353 A1 | 6/2005 | Johnson, Jr. et al. |
| 2006/0081372 A1 | 4/2006 | Dealy et al. |
| 2006/0086499 A1 | 4/2006 | Badalamenti et al. |
| 2006/0086502 A1 | 4/2006 | Reddy et al. |
| 2006/0086503 A1 | 4/2006 | Reddy et al. |
| 2006/0162926 A1 | 7/2006 | Roddy |
| 2006/0166834 A1 | 7/2006 | Roddy |
| 2006/0180308 A1 | 8/2006 | Welton et al. |
| 2006/0180309 A1 | 8/2006 | Welton et al. |
| 2006/0180310 A1 | 8/2006 | Welton et al. |
| 2006/0183646 A1 | 8/2006 | Welton et al. |
| 2006/0189487 A1 | 8/2006 | Szymanski et al. |
| 2006/0250243 A1 | 11/2006 | Masino et al. |
| 2007/0028810 A1 | 2/2007 | Lewis et al. |
| 2007/0029089 A1 | 2/2007 | Lewis et al. |
| 2007/0032550 A1 | 2/2007 | Lewis et al. |
| 2007/0056474 A1 | 3/2007 | Roddy et al. |
| 2007/0056475 A1 | 3/2007 | Roddy et al. |
| 2007/0056476 A1 | 3/2007 | Roddy et al. |
| 2007/0056728 A1 | 3/2007 | Roddy et al. |
| 2007/0056732 A1 | 3/2007 | Roddy et al. |
| 2007/0056733 A1 | 3/2007 | Roddy et al. |
| 2007/0056734 A1 | 3/2007 | Roddy et al. |
| 2007/0089643 A1 | 4/2007 | Roddy et al. |
| 2007/0089880 A1 | 4/2007 | Roddy et al. |
| 2007/0102157 A1 | 5/2007 | Roddy et al. |
| 2007/0119346 A1 | 5/2007 | Lewis et al. |
| 2007/0123434 A1 | 5/2007 | Lewis et al. |
| 2007/0125276 A1 | 6/2007 | Reddy et al. |
| 2007/0125534 A1 | 6/2007 | Reddy et al. |
| 2007/0155629 A1 | 7/2007 | Lewis et al. |
| 2007/0155982 A1 | 7/2007 | Lewis et al. |
| 2007/0203028 A1 | 8/2007 | Lewis et al. |
| 2007/0238621 A1 | 10/2007 | Roddy et al. |
| 2008/0011481 A1 | 1/2008 | Badalamenti et al. |
| 2008/0011482 A1 | 1/2008 | Badalamenti et al. |
| 2008/0041584 A1 | 2/2008 | Reddy et al. |
| 2008/0041585 A1 | 2/2008 | Reddy et al. |
| 2008/0041590 A1 | 2/2008 | Badalamenti et al. |
| 2008/0041591 A1 | 2/2008 | Reddy et al. |
| 2008/0169100 A1 | 7/2008 | Lewis et al. |
| 2008/0169101 A1 | 7/2008 | Lewis et al. |
| 2008/0171673 A1 | 7/2008 | Lewis et al. |
| 2008/0171674 A1 | 7/2008 | Lewis et al. |
| 2008/0171806 A1 | 7/2008 | Lewis et al. |
| 2008/0227667 A1 | 9/2008 | Szymanski et al. |
| 2008/0277116 A1 | 11/2008 | Roddy et al. |
| 2008/0305343 A1 | 12/2008 | Toohey et al. |
| 2009/0088348 A1 | 4/2009 | Roddy et al. |
| 2009/0139719 A1 | 6/2009 | Luo et al. |
| 2009/0159282 A1 | 6/2009 | Webb et al. |
| 2009/0200029 A1 | 8/2009 | Roddy et al. |
| 2009/0236097 A1 | 9/2009 | Roddy et al. |
| 2009/0260544 A1 | 10/2009 | Roddy et al. |
| 2009/0264557 A1 | 10/2009 | Lewis et al. |
| 2009/0312445 A1 | 12/2009 | Roddy et al. |
| 2009/0320720 A1 | 12/2009 | Roddy et al. |
| 2010/0016183 A1 | 1/2010 | Roddy et al. |
| 2010/0050905 A1 | 3/2010 | Lewis et al. |
| 2010/0051275 A1 | 3/2010 | Lewis et al. |

FOREIGN PATENT DOCUMENTS

| | | |
|---|---|---|
| GB | 2431400 | 4/2007 |
| WO | WO2006/136635 | 12/2006 |
| WO | WO2009/008735 | 1/2009 |

OTHER PUBLICATIONS

"BioMEMS Review: MEMS Technology for Physiologically Integrated Devices" Proc. IEEE, 2004, vol. 92(1), pp. 6-21.

"A Bubble-Driven Microfluidic Transport Element for Bioengineering" Proc. Natl. Acad. Sci. USA, 2004, vol. 101, pp. 9523-9527.

"Microfluidics with Ultrasound-Driven Bubbles" J. Fluid Mech., 2006, vol. 568, pp. 109-118.

Frim, J.A. et al., "Sonochemical Destruction of Free and Metal-Binding Ethylenediaminetetraacetic Acid" Water Research, 2003, 37, 3155-3163.

Notification of Transmittal of the International Search Report and the Written Opinion of the International Searching Authority, or Declaration (1 page); International Search Report (4 pages); and Written Opinion of the International Searching Authority (7 pages), mailed Apr. 28, 2011, for related international application PCT/GB2010/001560.

Abstract, Dmitrij Krylov et al., "Method of Cementing Oil-Gas Bore Hole" Thomson Scientific, London, AN 1978-61785A, XP002633100, Sep. 30, 1977 (1 page).

USPTO Office Action (17 pages) dated Jul. 12, 2011, for related U.S. Appl. No. 12/547,275.

European Search Report (4 pages) issued May 19, 2011, for related European application 11159484.2.

European Search Report (4 pages) issued May 19, 2011, for related European application 11159483.4.

Notification of Transmittal of the International Search Report and the Written Opinion of the International Searching Authority, or Declaration (1 page); International Search Report (4 pages); and Written Opinion of the International Searching Authority (5 pages), mailed Apr. 21, 2011, for related international application PCT/GB2010/001580.

Notification of Transmittal of the International Search Report and the Written Opinion of the International Searching Authority, or Declaration (1 page); International Search Report (4 pages); and Written Opinion of the International Searching Authority (5 pages), mailed Apr. 21, 2011, for related international application PCT/GB2010/001590.

* cited by examiner

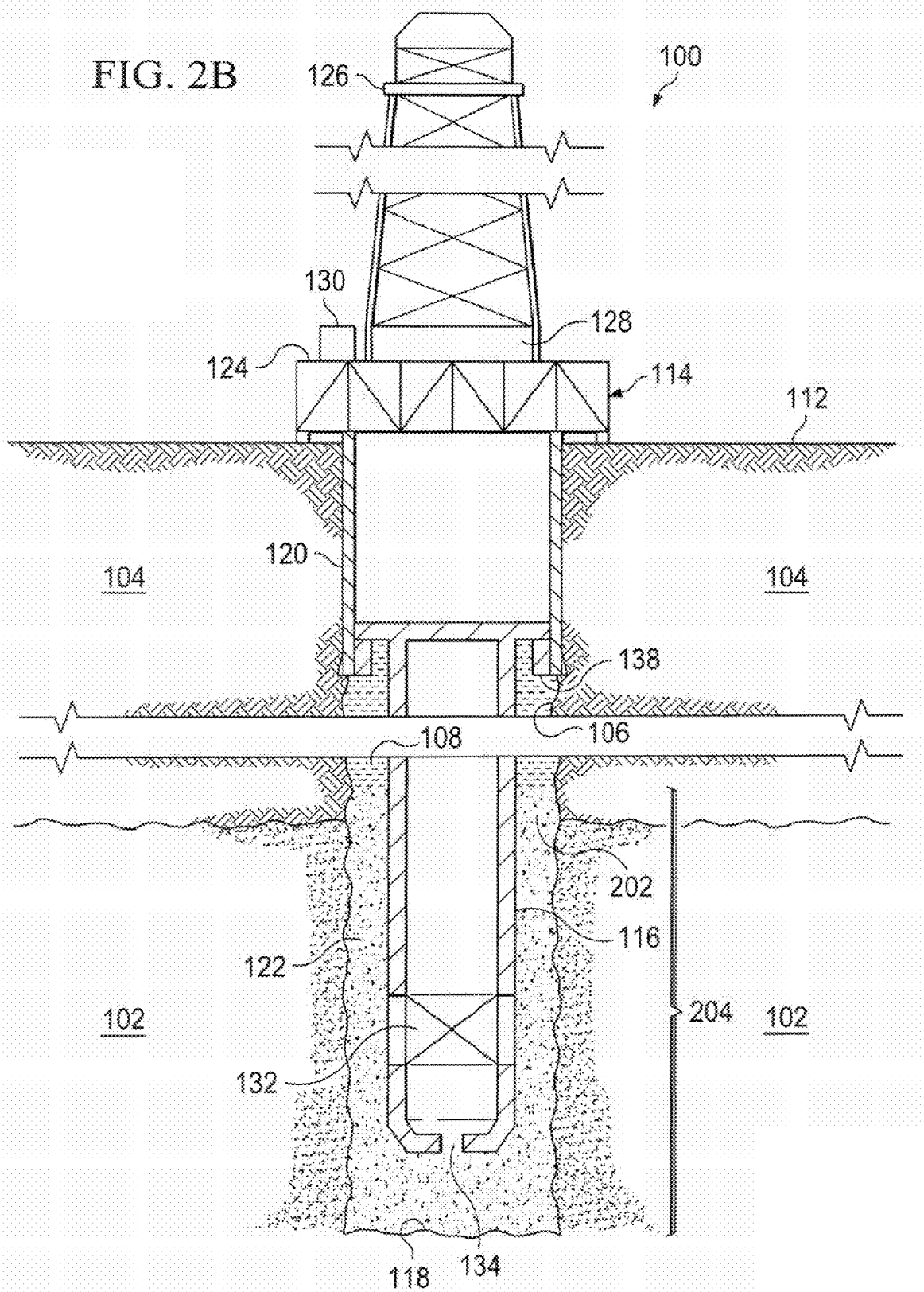

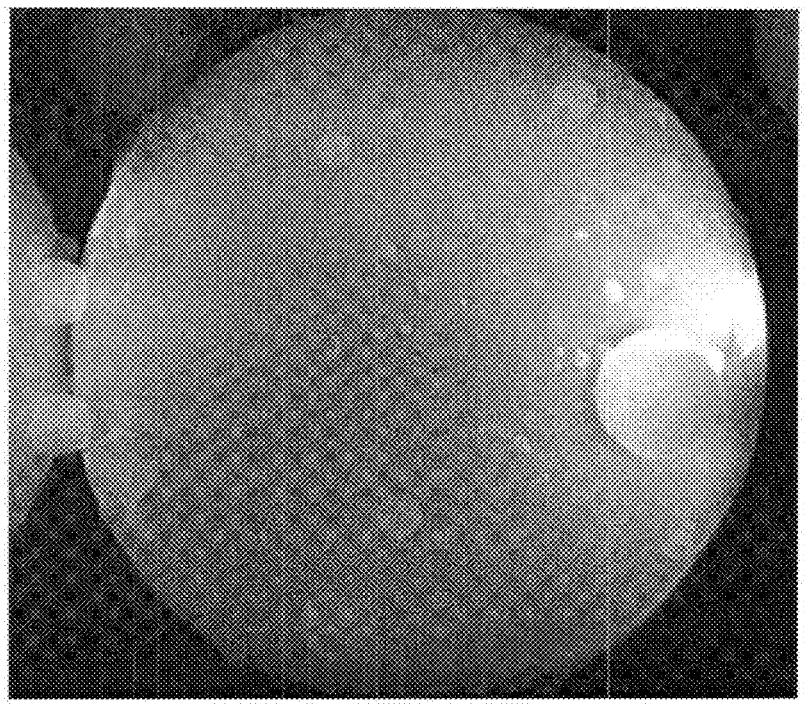
FIG. 7A  |← 5 μm →|
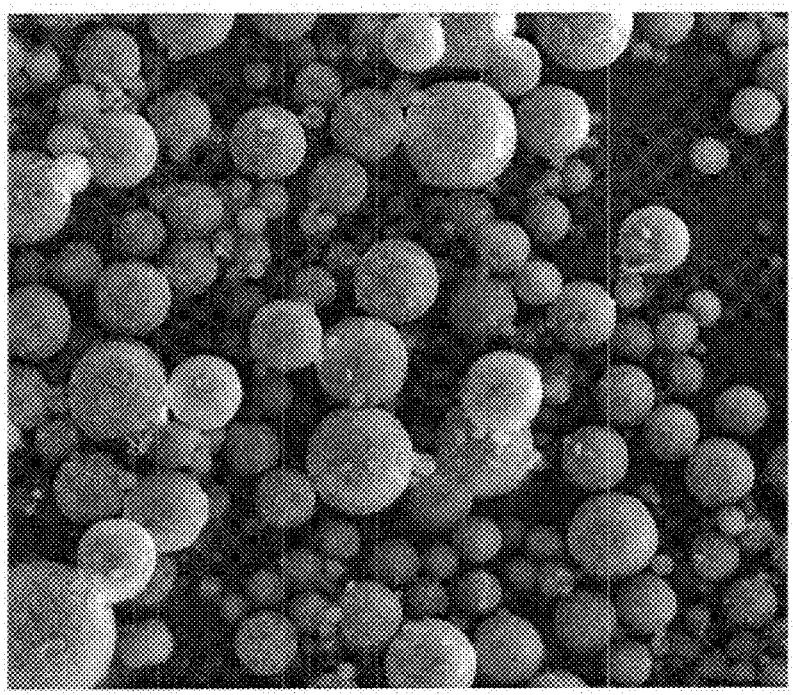
FIG. 7B  |← 50 μm →|

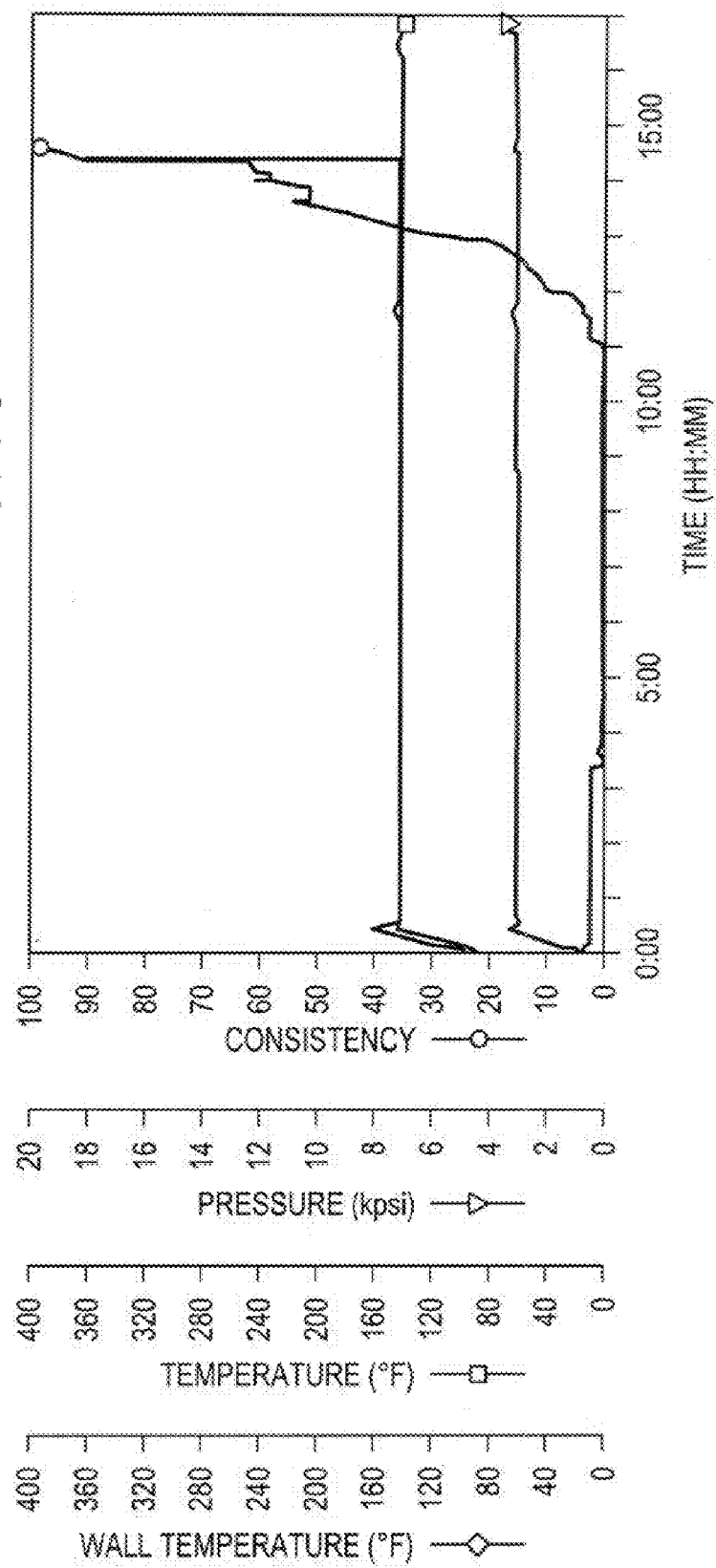

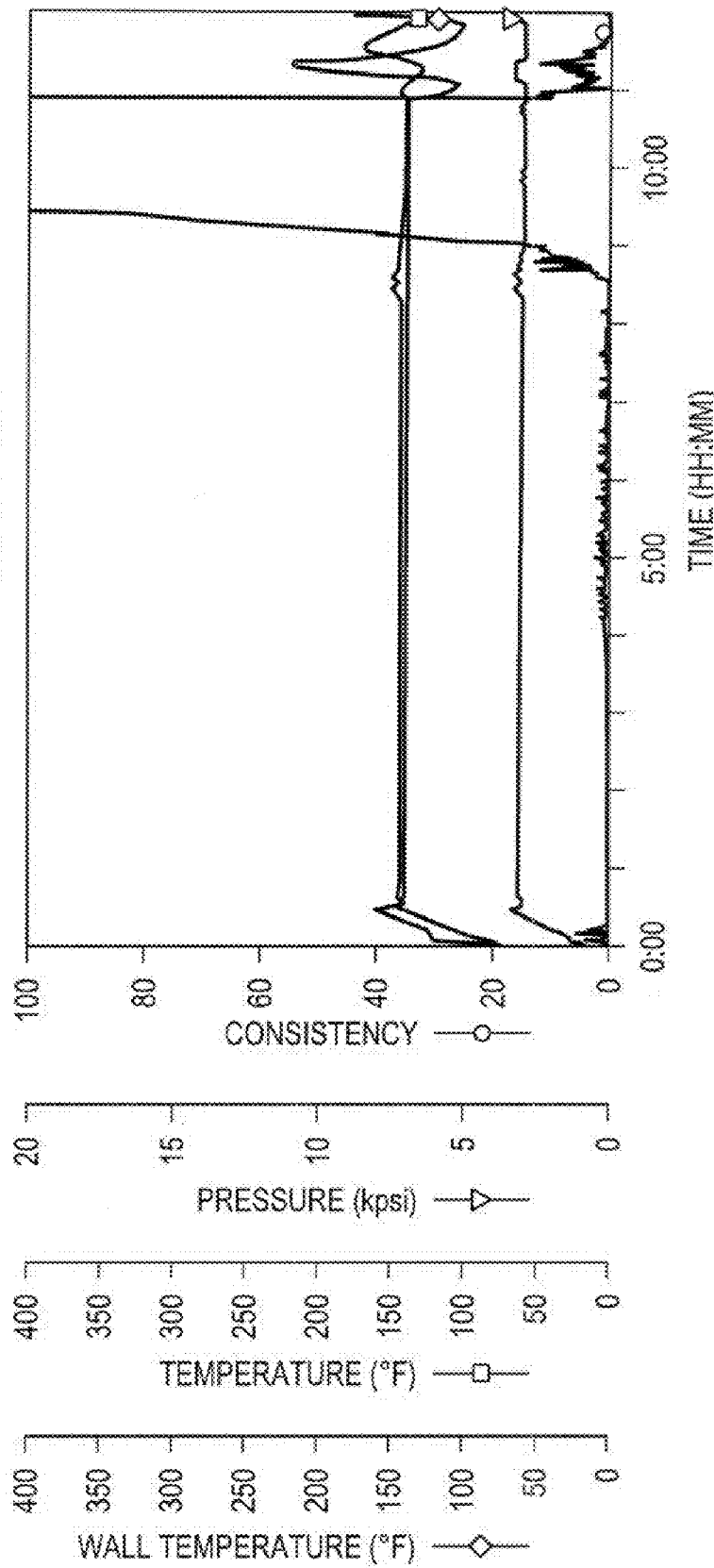

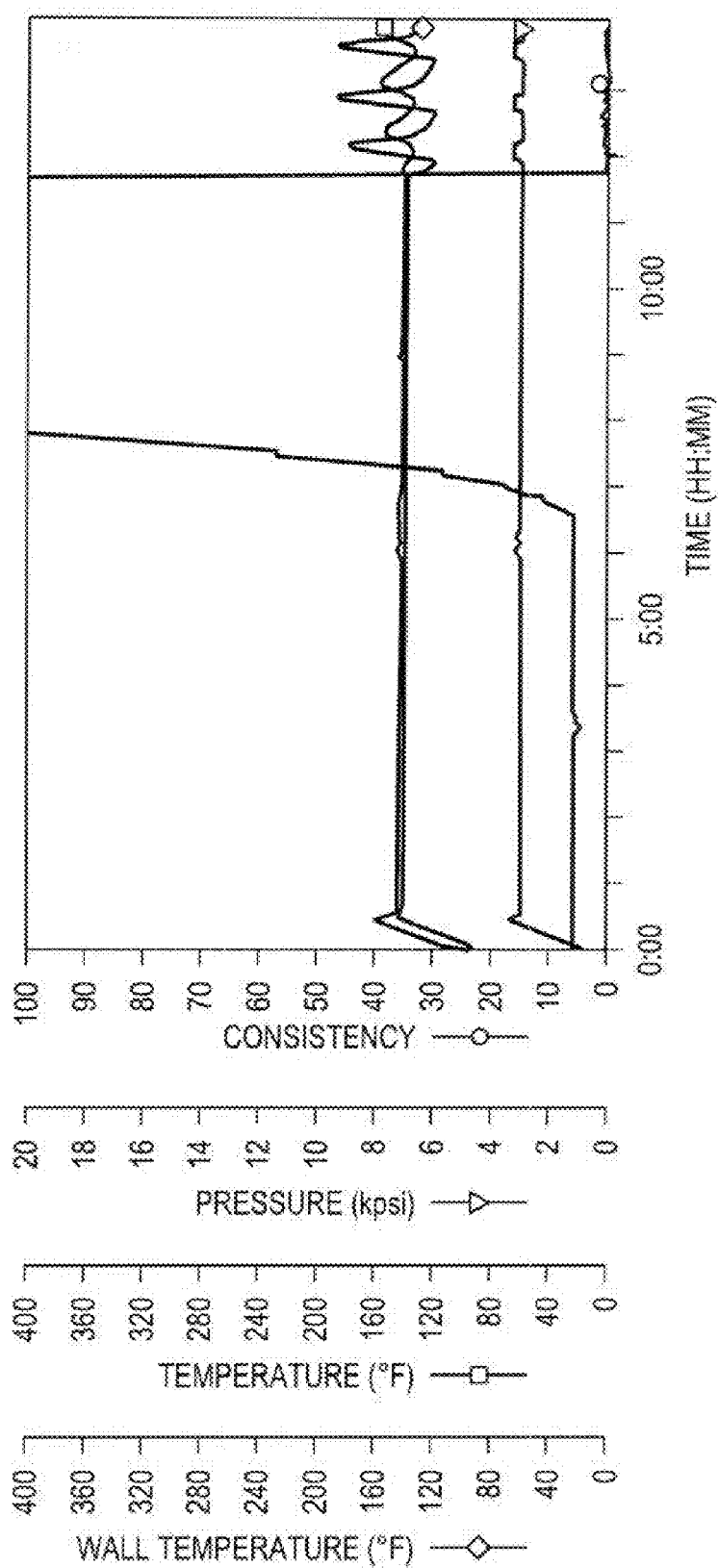

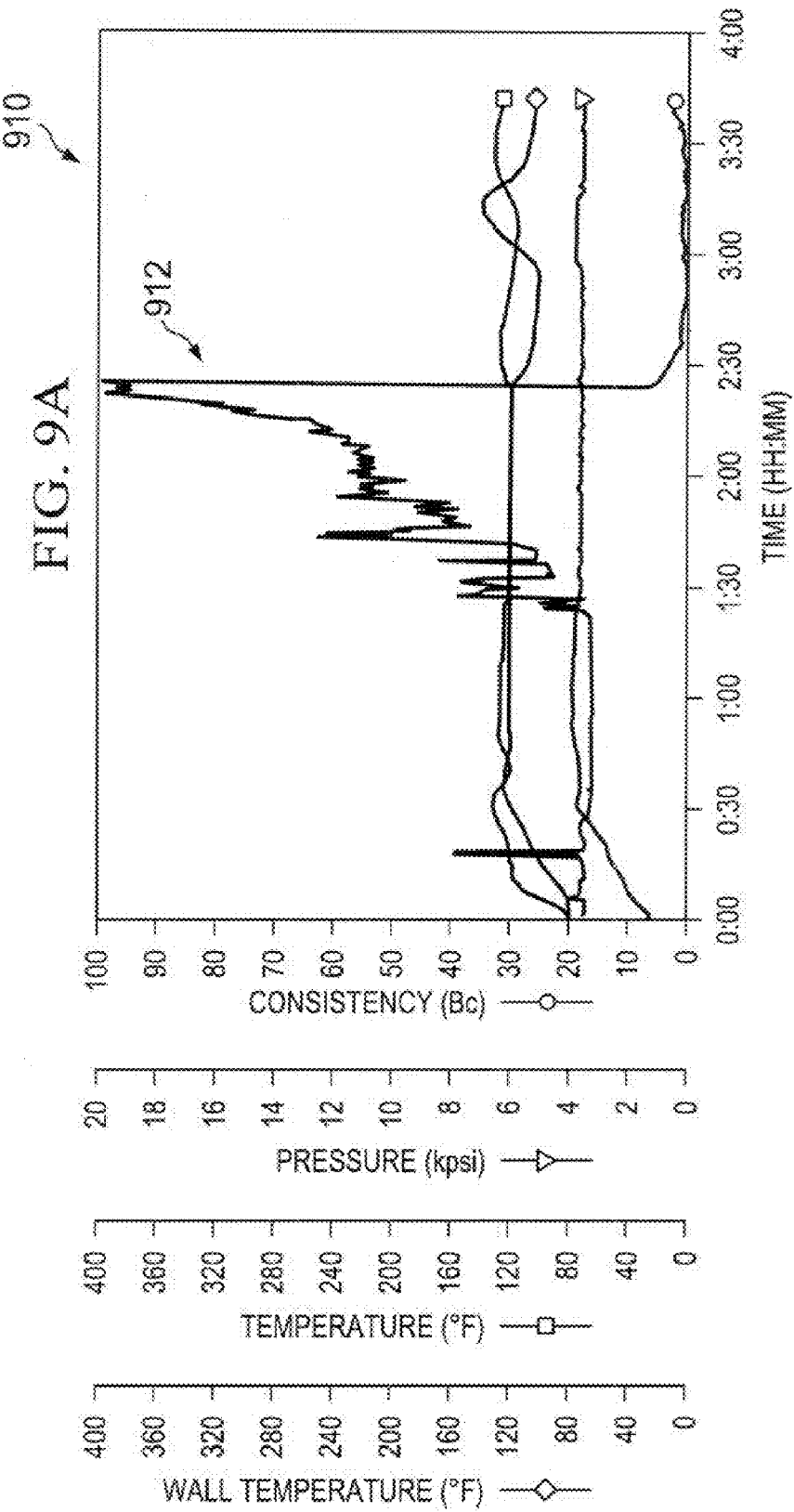

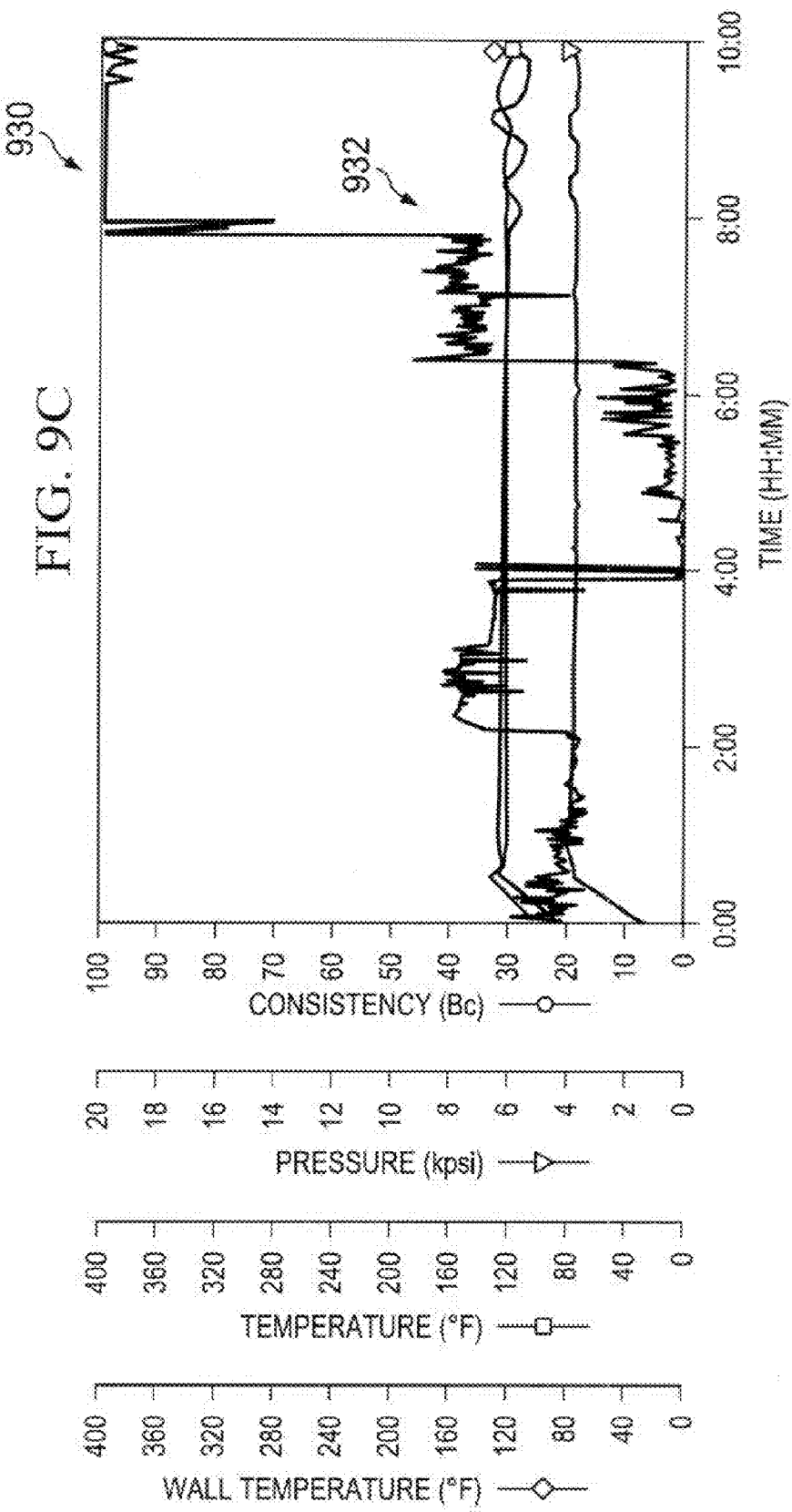

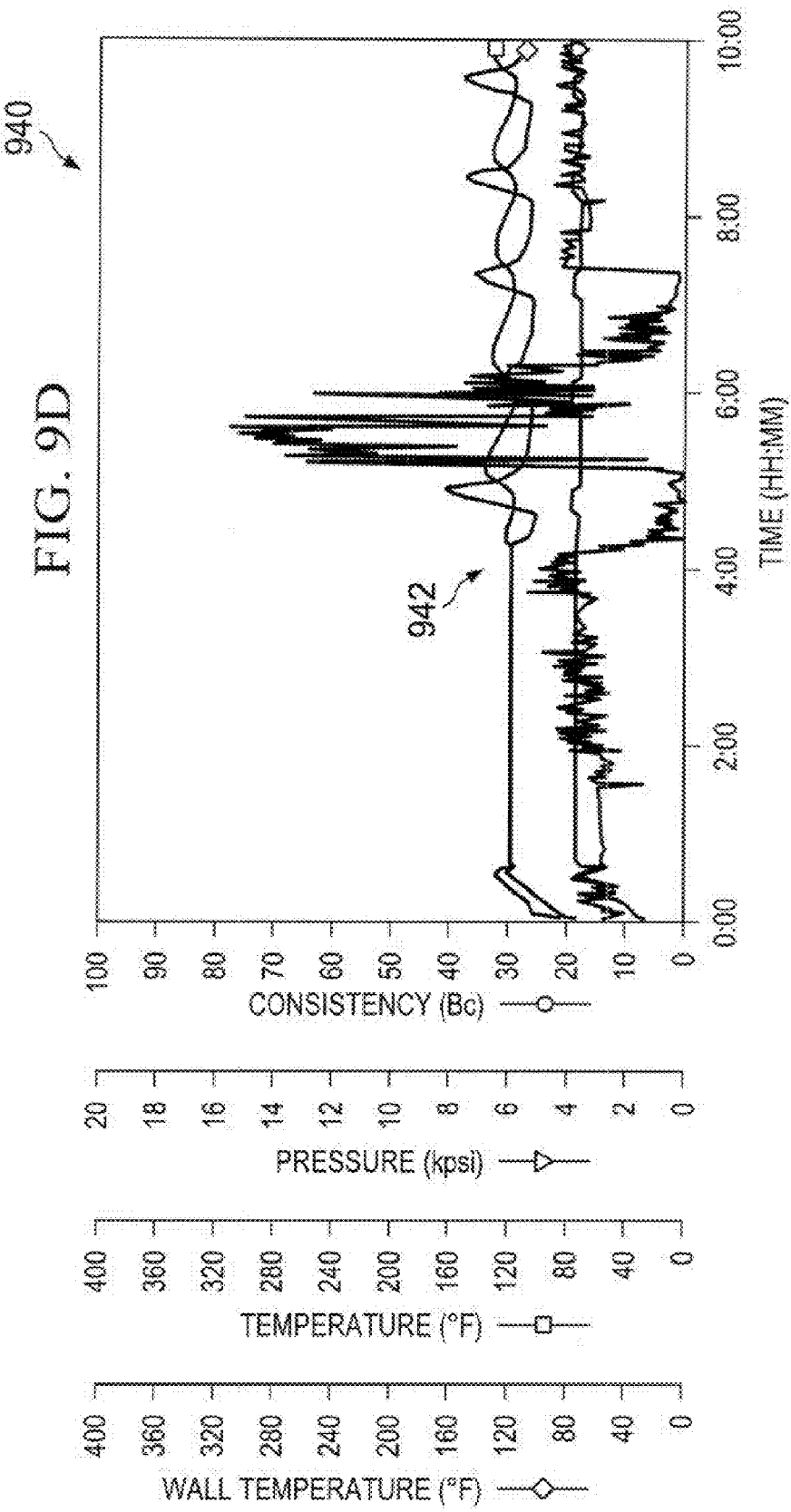

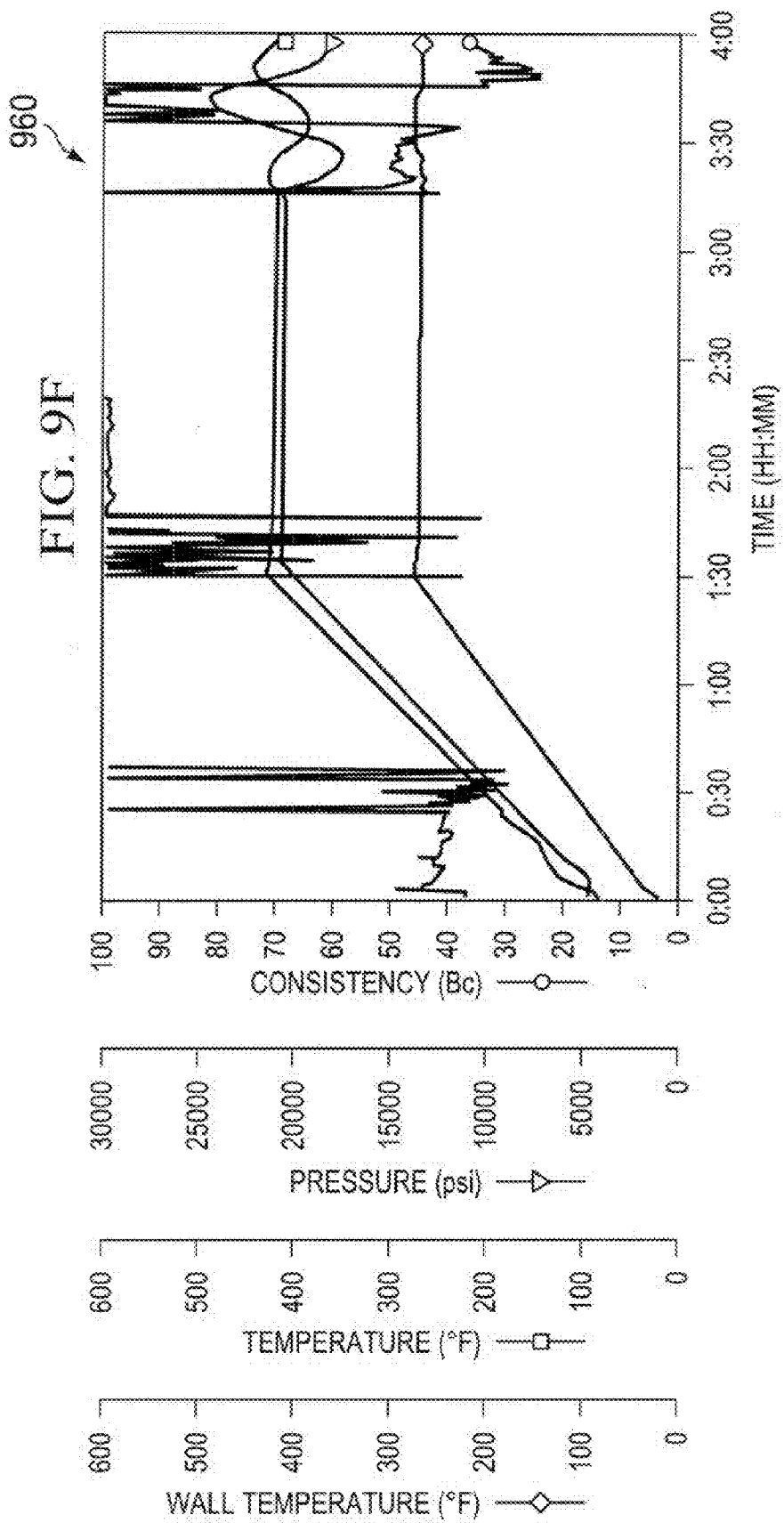

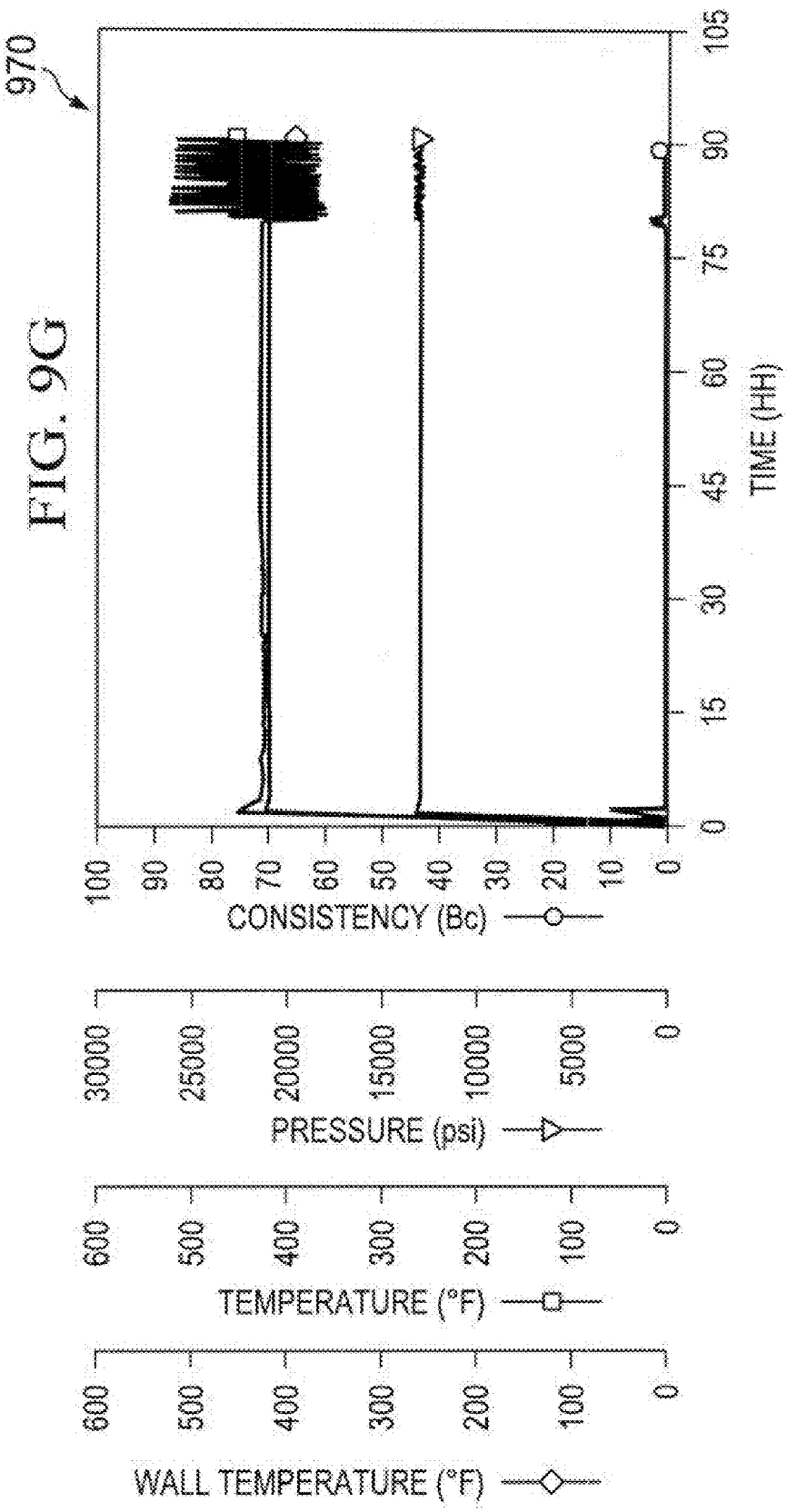

METHODS OF SONICALLY ACTIVATING CEMENT COMPOSITIONS

TECHNICAL FIELD

This invention relates to cementing operations and, more particularly, to methods of sonically activating cement compositions.

BACKGROUND

Some wellbores, for example, those of some oil and gas wells, are lined with a casing. The casing stabilizes the sides of the wellbore. In a cementing operation, cement is introduced down the wellbore and into an annular space between the casing and the surrounding earth. The cement secures the casing in the wellbore, and prevents fluids from flowing vertically in the annulus between the casing and the surrounding earth. Different cement formulations are designed for a variety of wellbore conditions, which may be above ambient temperature and pressure. In designing a cement formulation, a number of potential mixtures may be evaluated to determine their mechanical properties under various conditions.

SUMMARY

The present disclosure is directed to a system and method for sonically activating cement slurries. In some implementations, a method of treating a subterranean formation includes positioning a settable composition including a capsule in a wellbore. The capsule is used to increase a setting rate in response to at least sonic signals. A sonic signal is transmitted to at least a portion of the settable composition to release an activator from the capsule.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 2A and 2B are example cementing process in the well system of FIG. 1;

FIGS. 7A-F illustrate example capsules for activating a cement slurry in the system of FIG. 1;

FIGS. 9A-H illustrate example graphs demonstrating affects of sonic signals on cement slurries.

Like reference symbols in the various drawings indicate like elements.

DETAILED DESCRIPTION

The present disclosure is directed to one or more well systems having an on-command cement delivery system that selectively controls setting of a cement slurry. For example, the described systems may use sonic irradiation (e.g., ultrasound, terahertz), such as in the range from about 20 Hz to 2 MHz, to release activators to initiate or accelerate the cement setting (see FIG. 1) and/or may use ultrasound to directly activate or accelerate cement slurries (see FIG. 8). In some instances, the described systems may include a cement slurry and capsules that release activators into the cement slurry in response to ultrasound. An activator typically includes any chemicals that activate and/or accelerate the setting process for a cement slurry in the described systems. An activator may also retard or otherwise affect the setting or properties of the cement slurry. For example, the described systems may include one or more of the following activators: sodium hydroxide, sodium carbonate, calcium chloride, calcium nitrite, calcium nitrate, and/or others. In some implementations, the capsules may include elements that substantially enclose one or more activators and that release the activator in response to at least sonic signals. For example, the sonic signal may break or otherwise form an opening in the encapsulating element to release the one or more activators.

In regards to directly activating cement slurries, the described systems may directly activate the cement slurry using one or more different mechanisms responsive to sonic signals. The one or more different mechanisms may include modifying chemical properties, releasing chemicals, modifying physical properties (e.g., particle size), updating operating conditions (e.g., pressure, temperature), and/or other mechanisms responsive to sonic signals. For example, described systems may use sonic signals to directly minimize or otherwise reduce the effect of hydrophobic surfactants to, for example, enable the surfactants to enter into suspension and/or partially hydrate. In these instances, the described systems may directly activate cement slurries using sonic signals independent of introducing or adding chemicals to the cement slurry. In addition, the systems may include free-radical dopants in cement slurries that release autocatalytic free radicals in response to at least ultrasonic signals. Alternatively or in combination, the sonic signals may trigger or otherwise activate a polymerization process in the cement slurry to provide in-situ polymerization. In general, the described systems include a cement slurry in an annulus formed between a casing and a wellbore, and when the cement is set, the cement secures the casing in place. By selectively controlling the setting of a cement slurry, the described systems allow cement properties to be tailored once the cement slurry has been pumped down the borehole.

Figure 1:
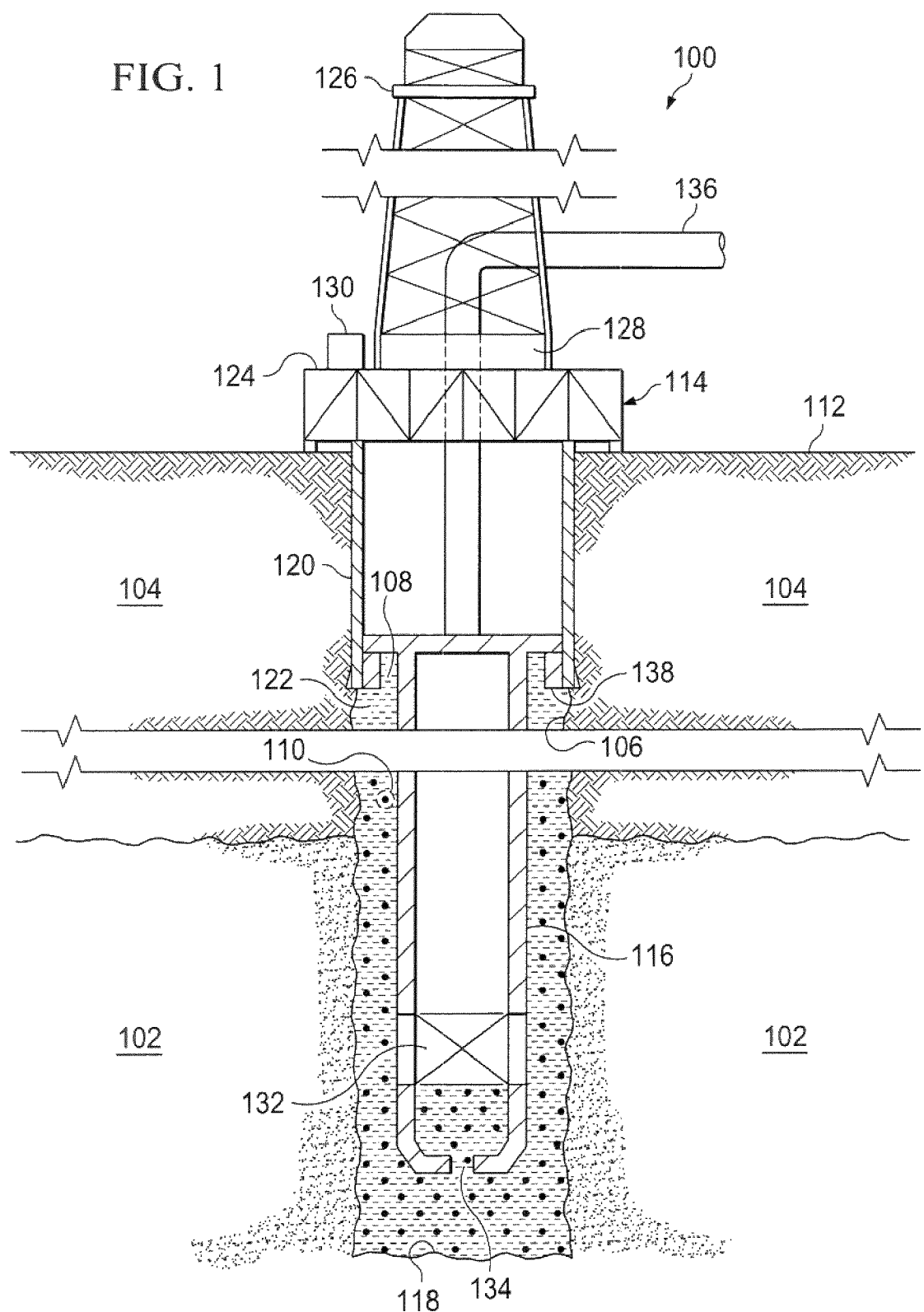
FIG. 1 is an example well system for producing fluids from a production zone.

Referring to FIG. 1, the system 100 is a cross-sectional well system 100 that initiates or accelerates the setting of cement slurring using encapsulated activators. In the illustrated implementation, the well system 100 includes a production zone 102, a non-production zone 104, a wellbore 106, a cement slurry 108, and capsules 110. The production zone 102 may be a subterranean formation including resources (e.g., oil, gas, water). The non-production zone 104 may be one or more formations that are isolated from the wellbore 106 using the cement slurry 108. For example, the zone 104 may include contaminants that, if mixed with the resources, may result in requiring additional processing of the resources and/or make production economically unviable. The cement slurry 108 may be pumped or selectively positioned in the wellbore 106, and the setting of the cement slurry 108 may be activated or accelerated using the capsules 110. In some implementations, the capsules 110 may release activators in response to ultrasound initiated by, for example, a user of the system 100. By controlling the setting, a user may configure the system 100 without substantial interference from the setting of the cement slurry 108.

Turning to a more detailed description of the elements of system 100, the wellbore 106 extends from a surface 112 to the production zone 102. The wellbore 106 may include a rig 114 that is disposed proximate to the surface 112. The rig 114 may be coupled to a casing 116 that extends the entire length of the wellbore or a substantial portion of the length of the wellbore 106 from about the surface 112 towards the production zones 102 (e.g., hydrocarbon-containing reservoir). In some implementations, the casing 116 can extend past the production zone 102. The casing 116 may extend to proximate a terminus 118 of the wellbore 106. In some implementations, the well 106 may be completed with the casing 116 extending to a predetermined depth proximate to the production zone 102. In short, the wellbore 106 initially extends in a substantially vertical direction toward the production zone 102. In some implementations, the wellbore 106 may include other portions that are horizontal, slanted or otherwise deviated from vertical.

The rig 114 may be centered over a subterranean oil or gas formation 102 located below the earth's surface 112. The rig 114 includes a work deck 124 that supports a derrick 126. The derrick 126 supports a hoisting apparatus 128 for raising and lowering pipe strings such as casing 116. Pump 130 is capable of pumping a variety of wellbore compositions (e.g., drilling fluid, cement) into the well and includes a pressure measurement device that provides a pressure reading at the pump discharge. The wellbore 106 has been drilled through the various earth strata, including formation 102. Upon completion of wellbore drilling, the casing 116 is often placed in the wellbore 106 to facilitate the production of oil and gas from the formation 102. The casing 116 is a string of pipes that extends down wellbore 106, through which oil and gas will eventually be extracted. A cement or casing shoe 132 is typically attached to the end of the casing string when the casing string is run into the wellbore. The casing shoe 132 guides the casing 116 toward the center of the hole and may minimize or otherwise decrease problems associated with hitting rock ledges or washouts in the wellbore 106 as the casing string is lowered into the well. The casing shoe 132 may be a guide shoe or a float shoe, and typically comprises a tapered, often bullet-nosed piece of equipment found on the bottom of the casing string 116. The casing shoe 132 may be a float shoe fitted with an open bottom and a valve that serves to prevent reverse flow, or U-tubing, of cement slurry 108 from annulus 122 into casing 116 after the cement slurry 108 has been placed into the annulus 122. The region between casing 116 and the wall of wellbore 106 is known as the casing annulus 122. To fill up casing annulus 122 and secure casing 116 in place, casing 116 is usually "cemented" in wellbore 106, which is referred to as "primary cementing." In some implementations, the cement slurry 108 may be injected into the wellbore 106 through one or more ports 134 in the casing shoe 132. The cement slurry 108 may flow through a hose 136 into the casing 116. In some instances where the casing 116 does not extend the entire length of the wellbore 106 to the surface 112, the casing 116 may be supported by a liner hanger 138 near the bottom of a previous casing 120.

Figure 2A:
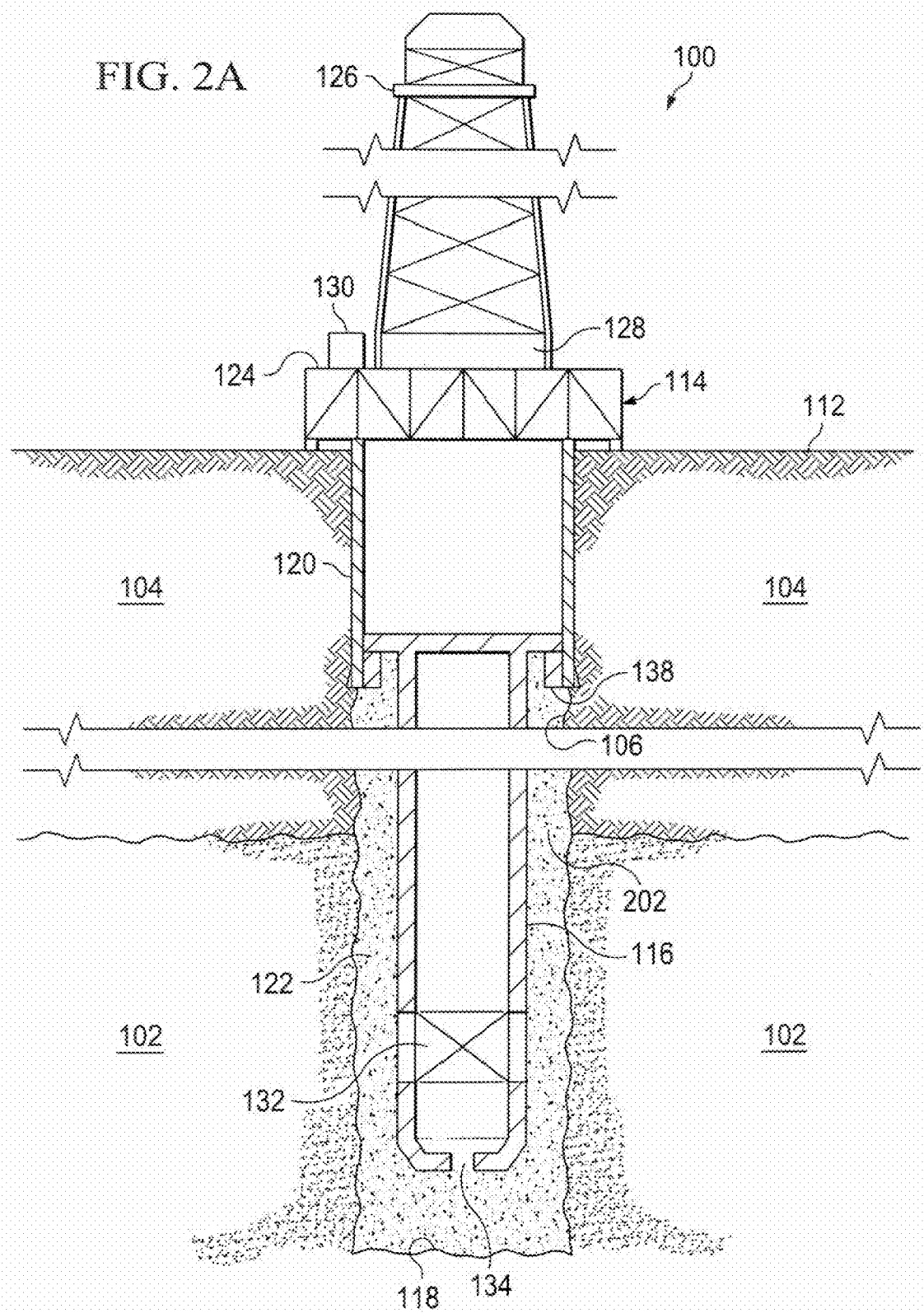

In some implementations, the system 100 may activate the setting of the cement slurry 108 using the capsules 110 during, for example, conventional primary cementing operation. In conventional primary cementing implementations, the capsules 110 may be mixed into the cement slurry 108 prior to entering the casing 116, and the cement slurry 108 may then be pumped down the inside of the casing 116. For example, the capsules 110 may be mixed in the cement slurry 108 at a density in the range of 4-24 pound per gallon (ppg). As the slurry 108 reaches the bottom of casing 116, it flows out of casing 116 and into casing annulus 122 between casing 116 and the wall of wellbore 106. As cement slurry flows up annulus 122, it displaces any fluid in the wellbore. To ensure no cement remains inside casing 116, devices called "wiper plugs" may be pumped by a wellbore servicing fluid (e.g., drilling mud) through casing 116 behind the cement slurry 108. The wiper contacts the inside surface of casing 116 and pushes any remaining slurry 108 out of casing 116. When cement slurry reaches the earth's surface 112, and annulus 122 is filled with slurry 108, pumping is terminated. In connection with pumping the cement slurry 108 into the annulus, an ultrasonic signal may be transmitted before, during, and/or after the pumping is complete to activate the capsules 110. In response to at least the signal, the capsules 110 may release activators that initiate and/or accelerate the setting of the cement slurry 108 in the annulus 122. Some or all of the casing 116 may be affixed to the adjacent ground material with set cement 202 as illustrated in FIGS. 2A and 2B. In some implementations, the casing 116 comprises a metal. After setting, the casing 116 may be configured to carry a fluid, such as air, water, natural gas, or to carry an electrical line, tubular string, or other elements.

After positioning the casing 116, a settable slurry 108 including capsules 110 may be pumped into annulus 122 by a pump truck (not illustrated). While the following discussion will center on the settable slurry 108 comprising a cement slurry 108, the settable slurry 108 may include other compounds such as resin systems, settable muds, conformance fluids, lost circulation, and/or other settable compositions. Example cement slurries 108 are discussed in more detail below. In connecting with depositing or otherwise positioning the cement slurry 108 in the annulus 122, the capsules 110 may release activators to activate or otherwise increase the setting rate of the cement slurry 108 in response to at least ultrasound. In other words, the released activators may activate the cement slurry 108 to set cement in the annulus 122.

In some implementations, the capsules 110 may release an activator that initiates or accelerates the setting of the cement slurry 108. For example, the cement slurry 108 may remain in a substantially slurry state for a specified period of time, and the capsules 110 may activate the cement slurry in response to ultrasound. In some instances, ultrasound may crack, break or otherwise form one or more holes in the capsules 110 to release the activators. In some instances, the ultrasound may generate heat that melts one or more holes in the capsules 110. The capsules 110 enclose the activators with, for example, a membrane such as a polymer (e.g., polystyrene, ethylene/vinyl acetate copolymer, polymethylmethacrylate, polyurethanes, polylactic acid, polyglycolic acid, polyvinylalcohol, polyvinylacetate, hydrolyzed ethylene/vinyl acetate, or copolymers thereof). The capsule 110 may include other materials responsive to ultrasound. In these implementations, the capsule 110 may include a polymer membrane that ultrasonically degrades to release the enclosed activators. In some examples, an ultrasonic signal may structurally change the membrane to release the activators such as, for example, opening a preformed slit in the capsules 110. In some implementations, at least one dimension of the capsules 110 may be microscopic such as in range from 10 nanometers (nm) to 15,000 nm. For example, the dimensions of the capsules 110 may be on a scale of a few tens to about one thousand nanometers and may have one or more external shapes including spherical, cubic, oval and/or rod shapes. In some implementations, the capsules 110 can be shells with diameters in the range from about 10 nm to about 1,000 nm. In other implementations, the capsules 110 can include a diameter in a range from about 15 micrometers to about 10,000 micrometers. Alternatively or in combination, the capsules 110 may be made of metal (e.g., gold) and/or of non-metallic material (e.g., carbon). In some implementations, the capsules 110 may be coated with materials to enhance their tendency to disperse in the cement slurry 108. The capsules 110 may be dispersed in the cement slurry at a concentration of $10^5$ to $10^9$ capsules/cm$^3$. In some implementations, the capsules 110 are a shell selected from the group consisting of a polystyrene, ethylene/vinyl acetate copolymer, and polymethylmethacrylate, polyurethanes, polylactic acid, polyglycolic acid, polyvinylalcohol, polyvinylacetate, hydrolyzed ethylene/vinyl acetate, and copolymers thereof.

The release activator may include sodium hydroxide, sodium carbonate, amine compounds, salts comprising calcium, sodium, magnesium, aluminum, and/or a mixture thereof. The capsule 110 may release a calcium salt such as calcium chloride. In some implementations, the capsule 110 may release a sodium salt such as sodium chloride, sodium aluminate, and/or sodium silicate. The capsule 110 may release a magnesium salt such as magnesium chloride. In some examples, the capsule 110 may release amine compounds such as triethanol amine, tripropanol amine, tri-isopropanol amine, and/or diethanol amine. In some implementations, the capsule 110 may release the activator in a sufficient amount to set the cement slurry 108 within about 1 minute to about 24 hours. In implementations including sodium chloride as the released activator, the concentration may be in the range of from about 3% to about 30% by weight of the cement in the cement slurry 108. In implementations including calcium chloride as the released activator, the concentration may be in the range of from about 0.5% to about 5% by weight of the cement in the cement slurry 108. In the case that the settable slurry 108 comprises resin, the release activator may include amine accelerators for a epoxy/novalac resins.

In some implementations, the capsule 110 may "flash-set" the cement slurry 108. As referred to herein, the term "flash-set" will be understood to mean the initiation of setting of the cement slurry 108 within about 1 minute to about 15 minutes after contacting the released activator. In some implementations, the previously identified activators may flash set the cement slurry 108. Flash-set activators may include sodium hydroxide, sodium carbonate, potassium carbonate, bicarbonate salts of sodium or potassium, sodium silicate salts, sodium aluminate salts, ferrous and ferric salts (e.g., ferric chloride and ferric sulfate), polyacrylic acid salts, and/or others. In some implementations, the following activators can flash-set the cement slurry 108 based on these activators exceeding a specified concentration: calcium nitrate, calcium acetate, calcium chloride, and/or calcium nitrite. In some implementations, the capsule 110 may release a solid activator.

In some implementations, the cement slurry 108 may comprise a "delayed set" cement compositions that remain in a slurry state (e.g., resistant to setting or gelation) for an extended period of time. In such implementations, a delay-set cement slurry 108 may include a cement, a base fluid, and a set retarder. In these and other implementations, activation may change the state of the cement slurry from delay set to neutral, to accelerated, or to less delayed. The cement slurry 108 may include other additives. The delayed-set cement slurry 108 typically remains in a slurry state for in range of about 6 hours to about 4 days under downhole or other conditions. That said, the cement slurry 108 may include components that result in a slurry state for a greater, or shorter, amount of time. For example, the cement slurry 108 may be mixed or otherwise made well ahead of positioning the slurry 108 in the annulus 122. The delayed-set cement slurry 108 can, in some implementations, include a cement, a base fluid, and a set retarder. The delayed-set cement slurry 108 may be set at a desired time, such as after placement, by activating the capsules 110 to release one or more activators.

In regards to cements included in the cement slurry 108, any cement suitable for use in subterranean applications may be suitable for use in the present invention. For example, delayed-set cement slurry 108 may include a hydraulic cement. In general, hydraulic cements typically include calcium, aluminum, silicon, oxygen, and/or sulfur and may set and harden by reaction with water. Hydraulic cements include, but are not limited to, Portland cements, pozzolanic cements, high aluminate cements, gypsum cements, silica cements, high alkalinity cements, and/or Sorel cements. In addition, the delayed-set cement slurry 108 may include cements based on shale or blast furnace slag. In these instances, the shale may include vitrified shale, raw shale (e.g., unfired shale), and/or a mixture of raw shale and vitrified shale. In some implementations, the settable composition 108 includes a polymer additive comprising at least one of a monomer, a pre-polymer, an oligomer, or a short chain polymer that polymerizes in response to the sonic signal In regards to base fluids included in the cement slurry 108, the delayed-set cement slurry 108 may include one or more base fluids such as, for example, an aqueous-based base fluid, a nonaqueous-based base fluid, or mixtures thereof. Aqueous-based may include water from any source that does not contain an excess of compounds (e.g., dissolved organics, such as tannins) that may adversely affect other compounds in the cement slurry 108. For example, the delayed-set cement slurry 108 may include fresh water, salt water (e.g., water containing one or more salts), brine (e.g., saturated salt water), and/or seawater. Nonaqueous-based may include one or more organic liquids such as, for example, mineral oils, synthetic oils, esters, and/or others. Generally, any organic liquid in which a water solution of salts can be emulsified may be suitable for use as a base fluid in the delayed-set cement slurry 108. In some implementations, the base fluid exceeds a concentration sufficient to form a pumpable slurry. For example, the base fluid may be water in an amount in the range of from about 25% to about 150% by weight of cement ("bwoc") such as one or more of the following ranges: about 30% to about 75% bwoc; about 35% to about 50% bwoc; about 38% to about 46% bwoc; and/or others.

In regards to set retarders in the cement slurry 108, the cement slurry 108 may include one or more different types of set retarders such as, for example, phosphonic acid, phosphonic acid derivatives, lignosulfonates, salts, organic acids, carboxymethylated hydroxyethylated celluloses, synthetic co- or ter-polymers comprising sulfonate and carboxylic acid groups, and/or borate compounds. And In some implementations, the set retarders used in the present invention are phosphonic acid derivatives. Examples of set retarders may include phosphonic acid derivatives commercially available from, for example, Solutia Corporation of St. Louis, Mo. under the trade name "DEQUEST." Another example set retarder may include a phosphonic acid derivative commercially available from Halliburton Energy Services, Inc., under the trade name "MICRO MATRIX CEMENT RETARDER." Example borate compounds may include sodium tetraborate, potassium pentaborate, and/or others. A commercially available example of a suitable set retarder comprising potassium pentaborate is available from Halliburton Energy Services, Inc. under the trade name "Component R." Example organic acids may include gluconic acid, tartaric acid, and/or others. An example of a suitable organic acid may be commercially available from Halliburton Energy Services, Inc. under the trade name "HR™ 25." Other examples of set retarders may be commercially available from Halliburton Energy Services, Inc. under the trade names "SCR-100" and "SCR-500." Generally, the set retarder in the delayed-set cement slurry 108 may be in an amount sufficient to delay the setting in a subterranean formation for a specified time. The amount of the set retarder included in the cement slurry 108 may be in one or more of the following ranges: about 0.1% to about 10% bwoc; about 0.5% to about 4% bwoc; and/or others.

In some implementations, the cement slurry 108 may not include a set retarder. For example, the system slurry 108 may include high aluminate cements and/or phosphate cements independent of a set retarder. In these instances, the activators may initiate setting of the slurry 108. For example, these activators may include alkali metal phosphate salts. High aluminate cement may comprise calcium aluminate in an amount in the range of from about 15% to about 45% by weight of the high aluminate cement, Class F fly ash in an amount in the range of from about 25% to about 45% by weight of the high aluminate cement, and sodium polyphosphate in an amount in the range of from about 5% to about 15% by weight of the high aluminate cement. In certain embodiments of the present invention wherein a cement composition comprising a phosphate cement is used, a reactive component of the cement composition (e.g., the alkali metal phosphate salt) may be used as an activator.

FIGS. 2A and 2B illustrate a cross sectional view of the well system 100 including activated set cement 202 in at least a portion of the annulus 122. In particular, the capsules 110 released activators in at least a portion of the cement slurry 108 to form the set cement 202. In FIG. 2A, the cement slurry flowed into the annulus 122 through the casing 116, and in response to at least a signal, the capsules 110 in the slurry 108 released an activator. In the illustrated example, substantially all capsules 110 in the annulus 122 released activators to form the set cement 202 along substantially the entire length of the annulus 122. Referring to FIG. 2B, the cement slurry 108 flowed into the annulus 122 through the casing 116, and in response to at least an ultrasonic signal, the capsules 110 in the slurry 108 released activators within a specified location 204. In the illustrated example, the region or location 204 is located proximate the zone 102. In other words, the capsules 110 proximate the zone 102 may release activators and form the set cement 202 located in the region 204. The ultrasonic signal may be localized to the region identified by 204, and in response to at least the localized signal, the set cement 204 forms. In some implementations, an initial amount of the cement slurry 108 may be exposed to an ultrasonic signal such that the setting period may be substantially equal to a period of time for the setting cement slurry 108 to flow to the location 204. In these examples, the cement slurry 108 may be exposed to the ultrasonic signal as the slurry 108 including the capsules 110 enters the casing 116. As the leading edge of cement slurry 108 begins to set, fluid flow through the annulus 122 may become more restricted and may eventually cease. Thus, the cement slurry 108 may be substantially prevented from flowing onto the surface 112 through the annulus 122. The remainder of the cement slurry 108 may set in the annulus 122 behind the leading edge as illustrated in FIG. 2A or the cement slurry 108 may set at a later time as illustrated in FIG. 2B. In the later, the remaining cement slurry 108 may be exposed to ultrasonic signals at a later time to initiate or accelerate the setting processes.

Figure 3A:
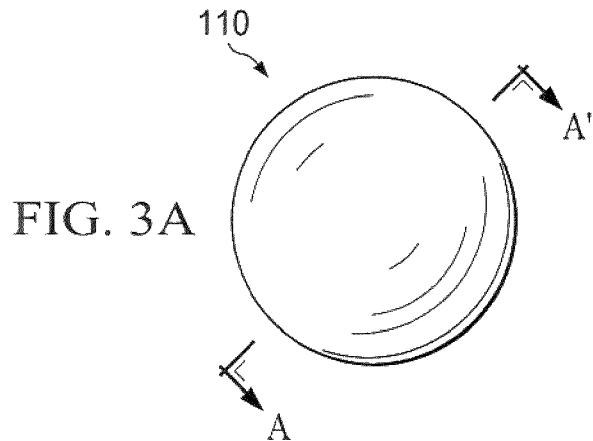
FIGS. 3A and 3B illustrate an example activation device for activating cement slurry in a wellbore.
Figure 3B:
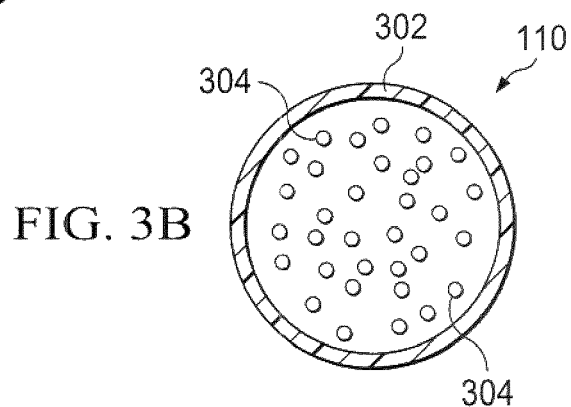

FIGS. 3A and 3B illustrates an example capsule 110 of FIG. 1 in accordance with some implementations of the present disclosure. In this implementation, the capsule 110 is spherical but may be other shapes as discussed above. The capsule 110 is a shell 302 encapsulating one or more activators 304 as illustrated in FIG. 3B. The capsule 110 releases one or more stored activators 304 in response to at least an ultrasonic signal. For example, the capsule 110 may crack or otherwise form one or more holes in response to at least the ultrasonic signal. The illustrated capsule 110 is for example purposes only, and the capsule 110 may include some, none, or all of the illustrated elements without departing from the scope of this disclosure.

Figure 4A:
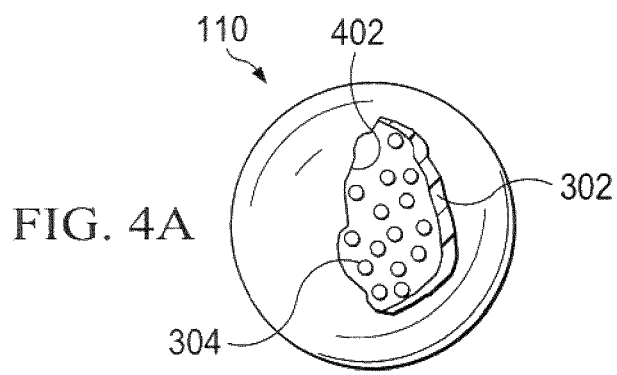
FIGS. 4A and 4B illustrate example processes for releasing activators in cement slurries.
Figure 4B:
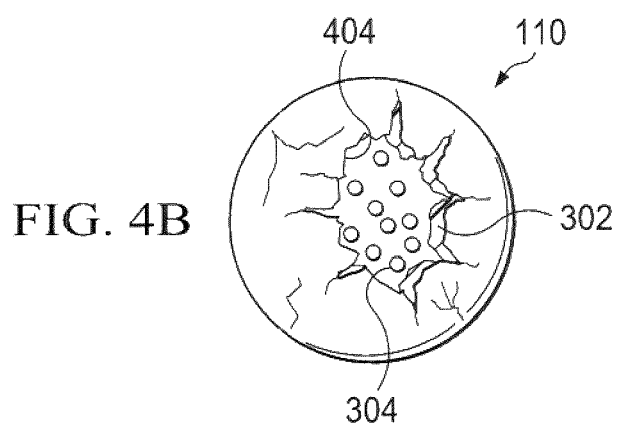

FIGS. 4A and 4B illustrate example implementations of the capsules 110 releasing one or more activators. The capsules 110 may release activators by heating one or more portions to form at least one opening, destroying or otherwise removing one or more portions, and/or other processes. The following implementations are for illustration purposes only, and the capsules 110 may release activators using some, all or none of these processes.

Referring to FIG. 4A, the capsule 110 forms an opening 402 through heat formed from ultrasonic signals. For example, the ultrasonic signals may directly heat the membrane of the capsule 110 and/or heat the surrounding cement slurry 108 to a temperature above the melting point. The capsule 110 may be a gold shell that when vibrated at its natural frequency melts at least a portion of the shell to release the enclosed activators. In these instances, the generated heat may melt or otherwise deform the shell to form an opening 402. In addition to metal membranes, the capsule 110 may be other materials such as a polymer. Referring to FIG. 4B, the capsule 110 forms cracks, breaks, or openings 404 in response ultrasonic signals. For example, the ultrasonic signal may crack or otherwise destroy portions of the capsule 110. In some implementations, the ultrasound may form defects in the membrane of the capsule and, as a result, form one or more openings 404 as illustrated.

Figure 5:
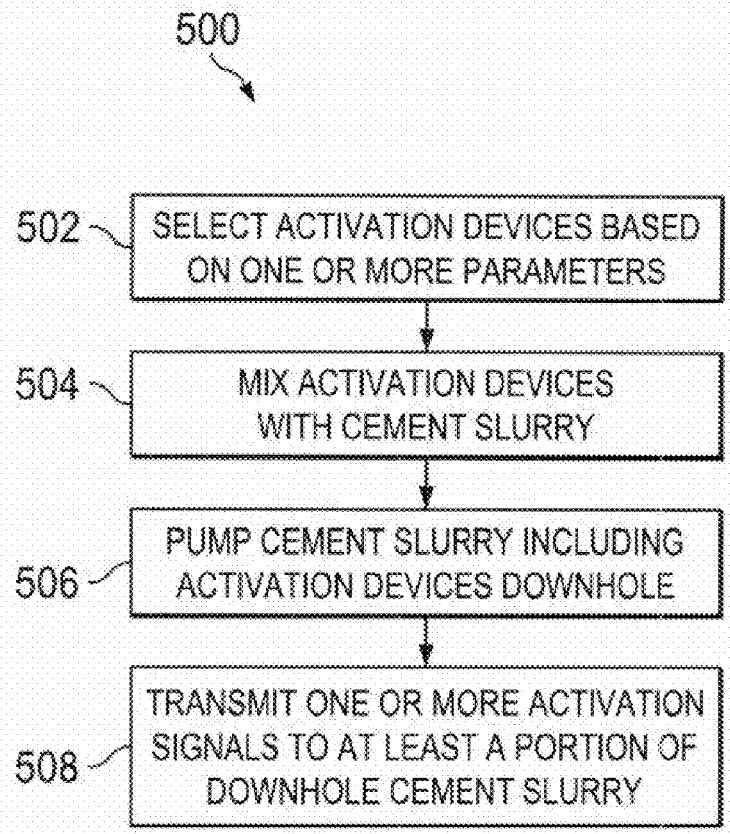
FIG. 5 is a flow chart illustrating an example method for activating deposited cement slurry.
Figure 6:
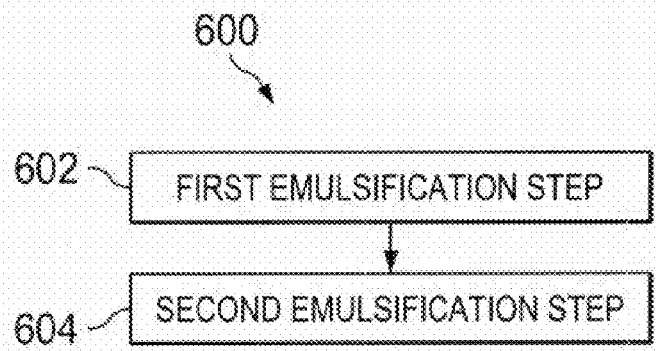
FIG. 6 is a flow chart illustrating an example method for fabricating capsules.
Figure 7E:
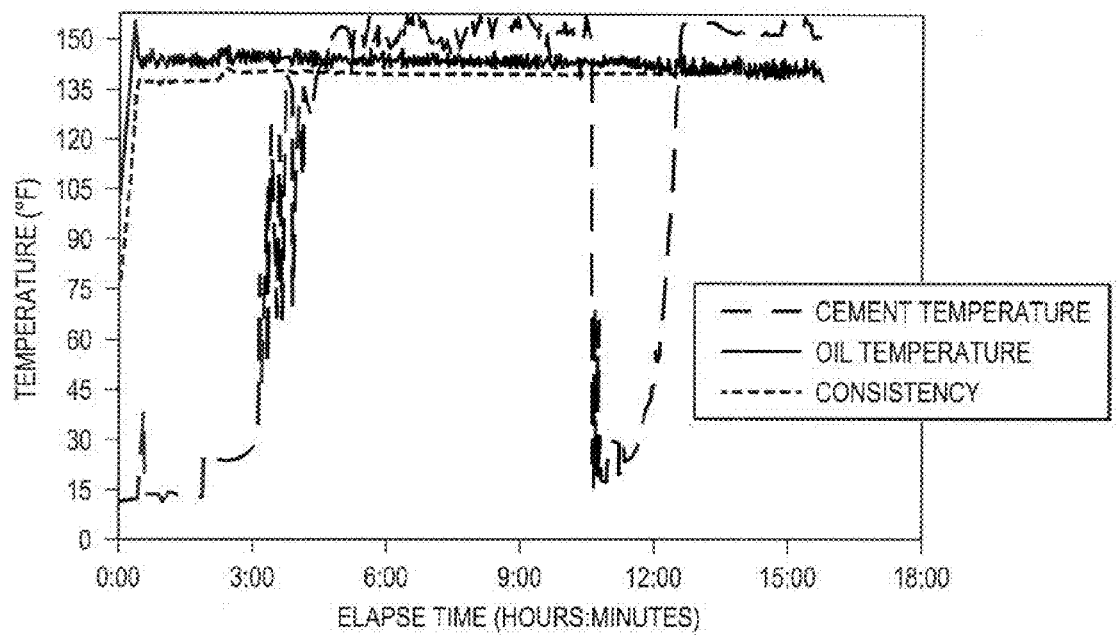

FIGS. 5 and 6 are flow diagrams illustrating example methods 500 and 600 for implementing and manufacturing devices including one or more activators. The illustrated methods are described with respect to well system 100 of FIG. 1, but these methods could be used by any other system. Moreover, well system 100 may use any other techniques for performing these tasks. Thus, many of the steps in these flowcharts may take place simultaneously and/or in different order than as shown. The well system 100 may also use methods with additional steps, fewer steps, and/or different steps, so long as the methods remain appropriate.

Referring to FIG. 5, method 500 begins at step 502 where capsules are selected based, at least in part, on one or more parameters. For example, the capsules 110 and the enclosed activators may be based, at least in part, on components of the cement slurry 108. In some implementations, the capsules 110 may be selected based on downhole conditions (e.g., temperature). At step 504, the selected capsules are mixed with a cement slurry. In some examples, the capsules 110 may be mixed with the cement slurry 108 as the truck 130 pumps the slurry into the annulus 122. In some examples, the capsules 110 may be mixed with dry cement prior to generating the cement slurry 108. Next, at step 506, the cement slurry including the capsules are pumped downhole. In some instances, the cement slurry 108 including the capsules 110 may be pumped into the annulus 122 at a specified rate. One or more ultrasonic signals are transmitted to the at least a portion of the downhole cement slurry at step 508. Again in the example, the transmitter may be lowered into the casing to transmit signals at a portion of the cement slurry 108. In this example, the transmitted signals may activate the capsules 110 proximate the shoe 132 to set that portion of the cement slurry 108 as illustrated in FIG. 2B. In some instances, the casing 116 may be moved (e.g., up/down) to assist in distributing the activators as desired.

Referring to FIG. 6, the method 600 begins at step 602 where a first emulsification step is performed. For example, a polystyrene dissolved in $CH_2Cl_2$ where saturated aqueous $CaCl_2$ may be emulsified using WS-36 (Sorbitan Monooleate). Next, at step 604, the first emulsification may then again be emulsified in a second step. In the example, the first emulsion may then be subsequently emulsified into a large volume (e.g., 10× excess) of a 2% polyvinylalcohol solution.

FIGS. 7A-F illustrate an example implementation of the capsules 110 in accordance with some implementations of the present disclosure. In this example, implementation, the capsules 110 encapsulate activators, and power ultrasound may break the capsules to release the activators on command. The illustrated capsules 110 are polystyrene microcapsules encapsulating aqueous $CaCl_2$. Though, the capsules 110 may be formed from other materials such as ethylene/vinyl acetate copolymer, polymethylmethacrylate, and/or others. In some instances, these types of capsules 110 may be created using a double emulsion technique. For example, the technique may include a polystyrene dissolved in $CH_2Cl_2$ where saturated aqueous $CaCl_2$ was emulsified using WS-36 (Sorbitan Monooleate). Next, this emulsion may then be subsequently emulsified into a large volume (e.g., 10× excess) of a 2% polyvinylalcohol solution. The double emulsion was stirred and heated to about 30° C. to drive off $CH_2Cl_2$ and concentrate the polystyrene ultimately forming liquid filled microcapsules. To evaluate these capsules, four different cement slurries were tested and the results are graphed in FIGS. 7C-F. A retarded slurry, a retarded slurry with $CaCl_2$, a retarded slurry with the microcapsules, and a retarded slurry with the microcapsules treated with sonication were evaluated. A 20 kHz ultrasonic horn was used for ten minutes at 50% power to treat the sonicated sample. The composition and results are listed in Tables 1-3 below.

TABLE 1

|  | Slurry 1 | Slurry 2 | Slurry 3 | Slurry 4 |
| --- | --- | --- | --- | --- |
| Description | Base Retarded | Retarded w/CaCl$_2$ | Encapsulated CaCl$_2$ | Sonicated Encap CaCl$_2$ |
| Water | 39.4% bwc 332 g | 39.4% bwc 332 g | 39.4% bwc 332 g | 39.4% bwc 332 g |
| Class H | 100% bwc 842.5 g | 100% bwc 842.5 g | 100% bwc 842.5 g | 100% bwc 842.5 g |
| HR-800 | 0.25% bwc 2.1 g | 0.25% bwc 2.1 g | 0.25% bwc 2.1 g | 0.25% bwc 2.1 g |
| CaCl$_2$ |  | 0.27% bwc 2.3 g |  |  |
| Encapsulated CaCl$_2$ |  |  | 0.27% bwc 2.3 g | 0.27% bwc 2.3 g |

TABLE 2

| Density | 16.4 ppg |
| --- | --- |
| Yield | 1.07 ft$^3$/sk |

TABLE 3

|  | Slurry 1 | Slurry 2 | Slurry 3 | Slurry 4 |
| --- | --- | --- | --- | --- |
| Pump time (70BC) | 14:19 | 9:17 | 12:20 | 7:35 |
| Hydration Heat | 16:00 | 11:00 | 16:00 | 11:20 |

The illustrated parameters including operating conditions are for illustration purposes only. The system 100 may use some, all or none of the values without departing from the scope of this disclosure.

Figure 8:
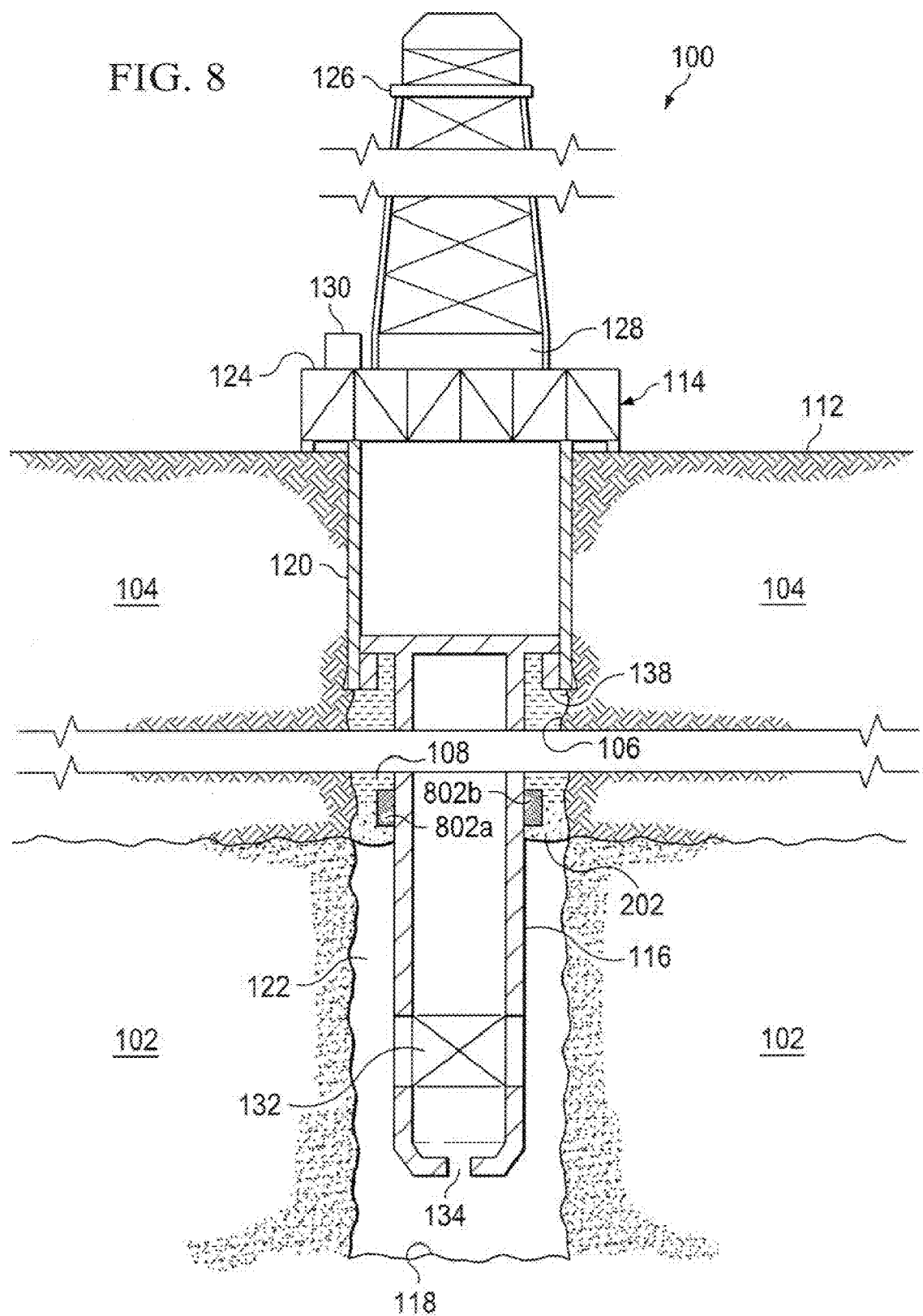
FIG. 8 is another example well system for producing fluids from a production zone.

FIG. 8 is another example system 100 that directly activates the cement slurry 108 using ultrasonic signals. For example, ultrasonic transducers 802a and 802b may be affixed to the exterior of the casing 116 and emit ultrasound to sonically activate the cement slurry. By sonically activating the cement slurry, the system 100 may set cement on-demand. For example, the system 100 may set the cement slurry 108 in a period of the range from 1 hour to 1 day. The sonic transducers 802 may directly activate the cement slurry 108 using one or more different mechanisms responsive to sonic signals. The one or more different mechanisms may include modifying chemical properties, releasing chemicals, modifying physical properties (e.g., particle size), updating operating conditions (e.g., pressure, temperature), and/or other mechanisms responsive to sonic signals. For example, the sonic transducers 802 may reduce the particulate size in the cement slurry 108 and, as a result, may increase the surface area. By increasing the surface area, the setting process may be initiated, accelerated, or otherwise activated. Alternatively or in combination, the sonic signals may increase the pressure and/or temperature and, as a result, may initiate, accelerate, or otherwise activate the setting process. In some implementations, the ultrasonic transducers 802 may activate accelerators in the cement slurry 108 and/or deactivate cement retarders in the cement slurry 108 to set the cement on demand. For example, the ultrasonic transducers 802 may generate ultrasonic or acoustic waves to initiate the setting process of the cement slurry 108 through, for example, the selective activation of accelerators in the cement slurry 108 such as $CaCl_2$ and/or the deactivation of cement retarders in the cement slurry 108 such as xylose. In some implementations, cement hydration inhibitors (in relatively low concentration) can work to alter the surface energy of the tricalcium aluminate, silicate and/or other compounds in the cement slurry 108, which can make the compounds more hydrophobic. The transducers 802 may ultrasonically agitate the cement slurry 108 to reduce the effect of hydrophobic surfactants, which may enable the compounds to enter into solution and/or partially hydrate. The transducers 802 may generate ultrasonic signals having a frequency that substantially matches the resonant conditions for inhibitor neutralization. In some implementations, the system 100 may execute frequency tuning to substantially optimize frequency and power combinations for a given geometry and inhibitor chemistry. In these instances, a user of the system 100 may remotely control the initiation of cement hydration. In addition, the system 100 may initiate an autocatalytic process. For example, the transducers 802 may generate ultrasonic signals that sets off an autocatalytic free-radical release that propagates through the cement slurry 108. In these instances, this process may initiate from a single point. The cement slurry 108 may include additives (e.g., free-radical dopants) that release free-radical species through out the slurry 108 in response to at least ultrasonic initiation or hydration.

FIGS. 9A-H illustrate example graphs demonstrating affects of sonic signals on cement slurries. In these examples, measurements were made on cement slurries that were sonically activated in comparison to cement slurries not sonically activated. In particular, ultrasound was used to accelerated the set of retarded cement slurries. The cement slurries were retarded using one of the following three retarders: EDTA; a combination of FDP-C742A and EDTA; and a combination of FDP-C742A and Component R. Without exposure to ultrasound, the cement slurries pumped between 6.5 hours to 80 hours. After exposure to 20 kHz of ultrasound, the pump times for these slurries may be reduced 40-50%. In addition, a control pump time using neat cement with and without exposure to ultrasound was run. The ultrasound exposure did not appear to affect the pump time of the neat cement. Based, at least in part, on the data, the ultrasound appears to target the retarders and may be accelerating the setting process as a result.

Figure 9B:
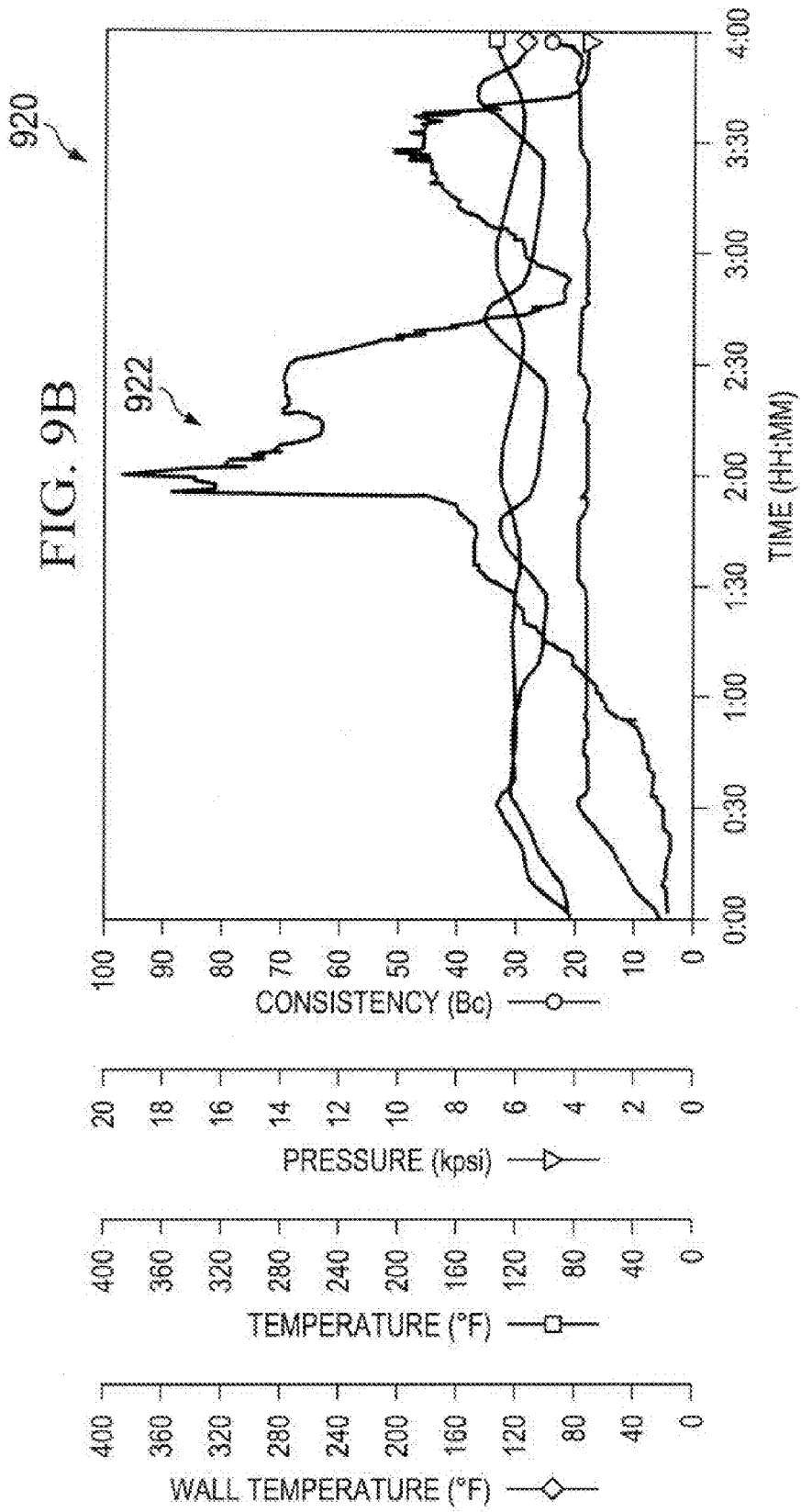

Referring to FIG. 9A, the graph 910 plots data for cement slurry comprising 16.4 PPG (Class H cement, neat) operating at 120° F. and 3600 PSI in 30 minutes. The cement slurry was not exposed to ultrasound. The graph 910 includes a peak 912 indicating the pump time to be 2 hours and 23 minutes. Referring to FIG. 9B, the graph 920 plots data for the same cement slurry as graph 910 including exposure to 20 kHz ultrasound for seven minutes. In this experiment, the ultrasound was shut off after 5 minutes to due to an increase in the cement-slurry temperature. The cement slurry was exposed to an additional 2 minutes of the ultrasound once cooled. The graph 920 includes a peak 922 indicating the pump time to be 2 hours.

Referring to FIG. 9C, the graph 930 plots data for cement slurry comprising 16.4 PPG (Class H cement, 1% EDTA) operating at 120° F. and 3600 PSI in 30 minutes. The cement slurry was not exposed to ultrasound. The graph 930 includes a peak 932 indicating the pump time to be 7 hours and 45 minutes. Referring to FIG. 9D, the graph 940 plots data for the same cement slurry as graph 930 including exposure to 20 kHz ultrasound for 7 minutes (5 minutes on, 2 minutes off, 2 minutes on). In this experiment, the ultrasound was shut off after 5 minutes due to an increase in the cement-slurry temperature. The cement slurry was exposed to an additional 2 minutes of the ultrasound once cooled. The pump time was 4 hours 15 minutes.

Figure 9E:
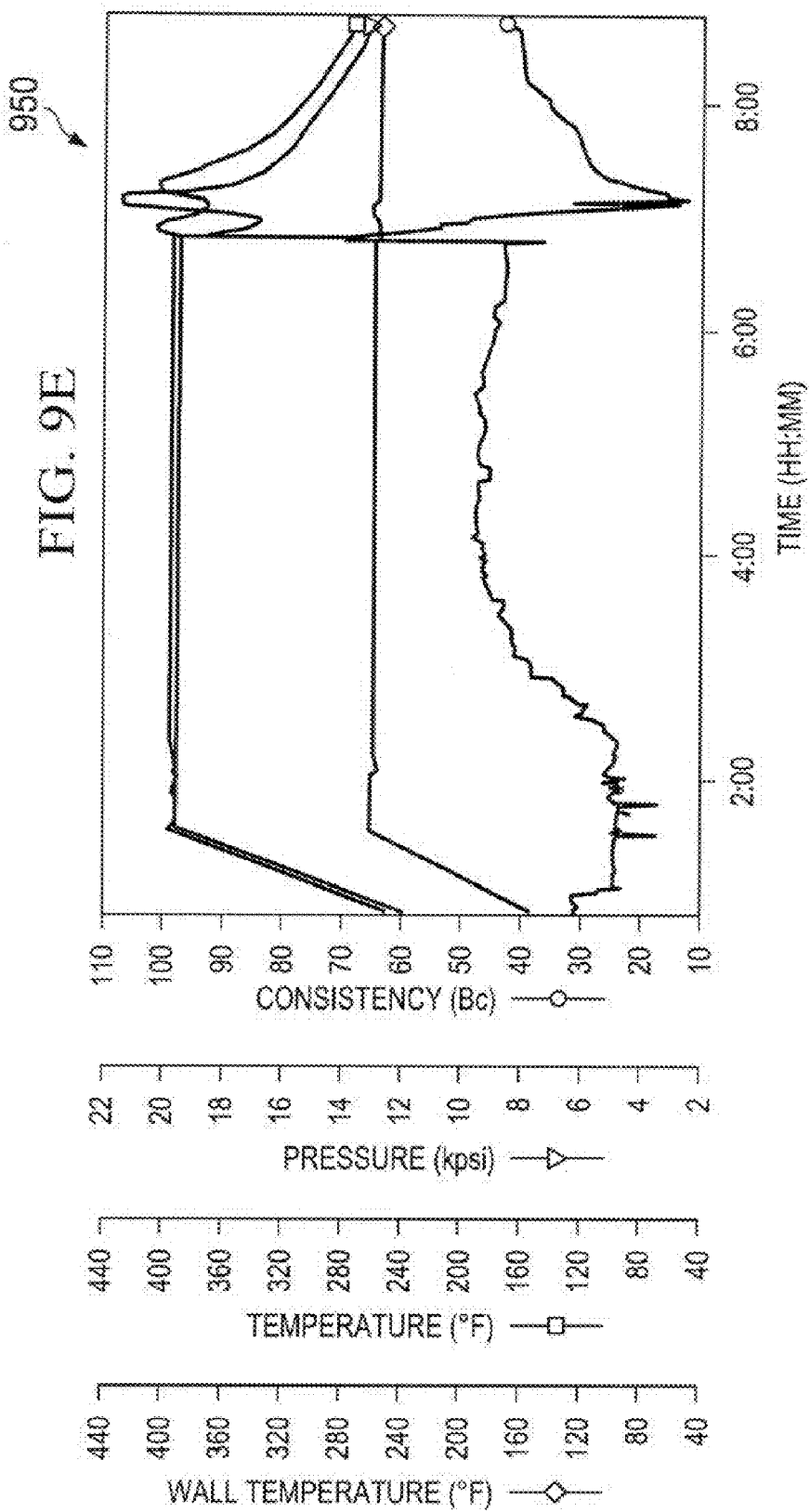

Referring to FIG. 9E, the graph 950 plots data for cement slurry comprising 16.4 PPG (Class G cement w/35% SSA-1; 10.4 SSA-1; 1% CFR-3; 0.8% Halad-200; 0.4 gal/sk Gascon 469; 1.8% FDP-C742A; 1.8% EDTA; 0.3 gal/sk NF-6) with the % in bwoc. The operating conditions were 400° F. and 13100 PSI in 90 minutes. The cement slurry was not exposed to ultrasound. The pump time was 6 hours and 46 minutes. Referring to FIG. 9F, the graph 960 plots data for the same cement slurry as graph 950 including exposure to 20 kHz ultrasound for 15 minutes (10 minutes on, 1 minutes off, 5 minutes on). In this experiment, the ultrasound was shut off after 10 minutes due to an increase in the cement-slurry temperature. The cement slurry was exposed to an additional 5 minutes of the ultrasound once cooled. The pump time was 3 hours 15 minutes.

Figure 9H:
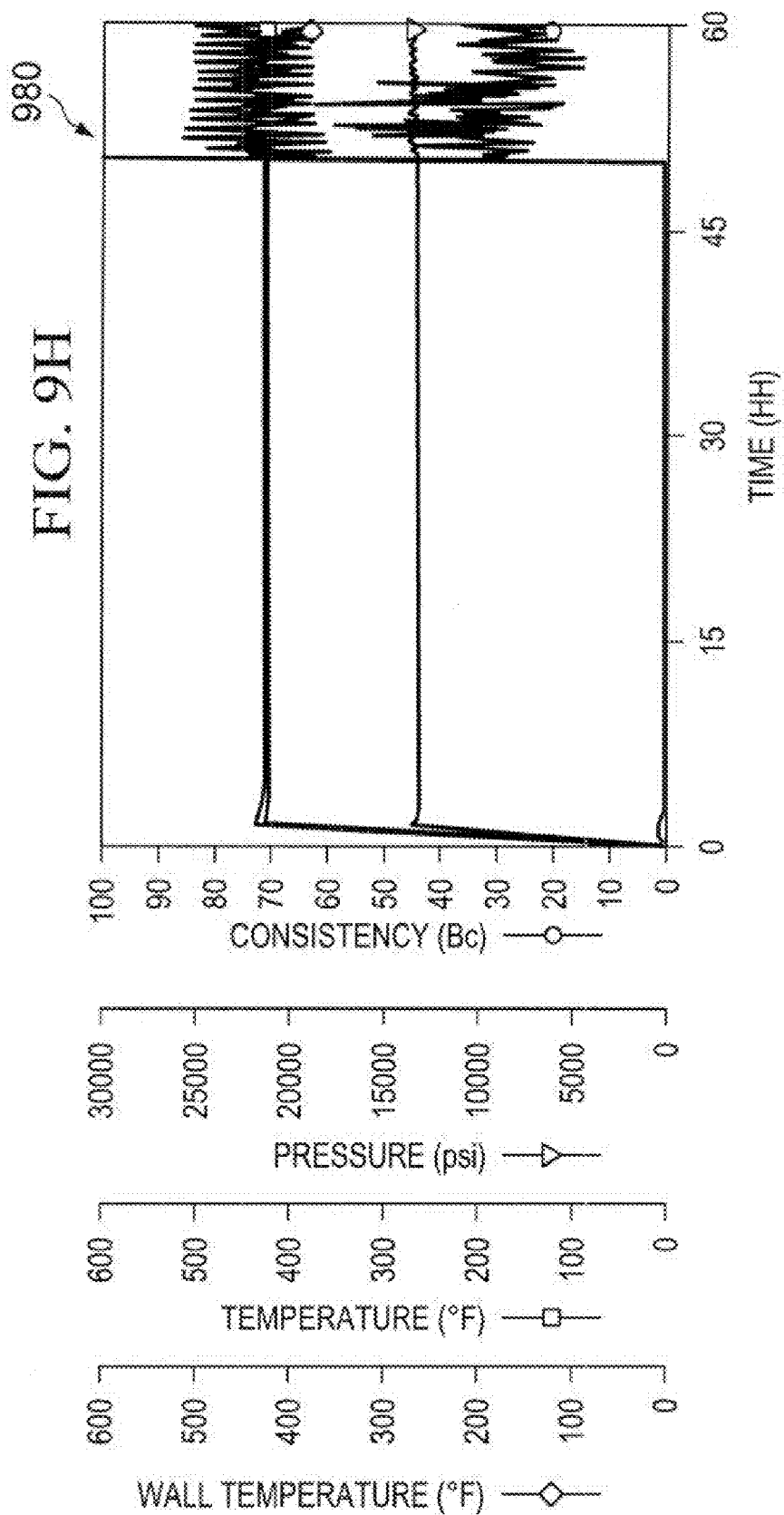

Referring to FIG. 9G, the graph 970 plots data for cement slurry comprising 16.4 PPG (Class G cement w/35% SSA-1; 10.4 SSA-1; 1% CFR-3; 0.8% Halad-200; 0.4 gal/sk Gascon 469; 1.8% FDP-C742A; 0.8% Compound R; 0.3 gal/sk NF-6) with the % in bwoc. The operating conditions were 422° F. and 13100 PSI in 90 minutes. The cement slurry was not exposed to ultrasound. The pump time was 79 hours. Referring to FIG. 9H, the graph 980 plots data for the same cement slurry as graph 970 including exposure to 20 kHz ultrasound for 15 minutes (5 minutes intervals). The pump time was 50 hours.

The present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. Whenever a numerical range with a lower limit and an upper limit is disclosed, any number and any included range falling within the range is specifically disclosed. In particular, every range of values (of the form, "about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A method of treating a subterranean formation, comprising:
   placing a settable composition including a capsule in a wellbore, wherein the capsule is used to increase a setting rate in response to a sonic signal; and
   transmitting the sonic signal to at least a portion of the settable composition to release an activator from the capsule, wherein the activator is configured to increase setting rate of the settable composition.

2. The method of claim 1, wherein the capsule is sonically activated.

3. The method of claim 2, wherein the capsule comprises a shell enclosing one or more activators.

4. The method of claim 3, wherein the shell comprises a sonically responsive polymer.

5. The method of claim 1, wherein the capsule comprises a shell selected from the group consisting of a polystyrene, ethylene/vinyl acetate copolymer, polymethylmethacrylate, polyurethanes, polylactic acid, polyvinylalcohol, polyvinylacetate, hydrolyzed ethylene/vinyl acetate, and copolymers thereof.

6. The method of claim 1, wherein the settable composition sets in a range from about one minute to about 24 hours after reacting with the activator.

7. The method of claim 1, wherein the settable composition includes at least one of a cement composition, a resin composition, a settable mud, a conformance fluid, or a lost circulation composition.

8. A method of cementing in a subterranean formation, comprising:
   placing a cement composition including a capsule in a wellbore, wherein the capsule encapsulates an activator configured to increase a setting rate of the cement composition; and
   transmitting a sonic signal to at least a portion of the cement composition to release the activator from the encapsulating capsule.

9. The method of claim 8, wherein the capsule is sonically activated.

10. The method of claim 9, wherein the capsule comprises a shell encapsulating one or more activators.

11. The method of claim 10, wherein the shell comprises a sonically responsive polymer.

12. The method of claim 8, wherein each of the plurality of capsules comprise a shell selected from the group consisting of a polystyrene, ethylene/vinyl acetate copolymer, polymethylmethacrylate, polyurethanes, polylactic acid, polyvinylalcohol, polyvinylacetate, hydrolyzed ethylene/vinyl acetate, and copolymers thereof.

13. The method of claim 8, wherein a plurality of capsules are mixed with the cement composition to an activator concentration from about 0.5% to about 30% by weight of cement.

14. The method of claim 8, wherein the cement composition comprises a hydraulic cement, a base fluid and a retarder.

15. The method of claim 8, wherein the cement composition is selected from the group consisting of Portland cement, pozzolanic cement, high aluminate cement, gypsum cement, silica cement, high alkalinity cement and sorel cement.

16. The method of claim 8, wherein the cement composition sets in a range from about one minute to about 24 hours after reacting with the activator.

17. The method of claim 8, wherein at least one dimension of the capsule is from about 10 nanometers to about 10,000 micrometers.

18. The method of claim 8, wherein the capsule comprises a spheroid with at least one dimension in a range from about 5 micrometers (μm) to about 20 μm.

19. The method of claim 8, wherein the sonic signal is transmitted at a frequency in a range from about 20 Hertz to about 2 megaHertz (MHz).

20. The method of claim 8, wherein the sonic signal comprises an ultrasonic signal.

21. The method of claim 20, wherein the ultrasonic signal substantially centered at frequency in a range from about 20 to about 2 MHz.

22. The method of claim 8, wherein the sonic signal comprises an acoustic signal.

23. The method of claim 22, wherein the acoustic signal is transmitted at a frequency in a range from about 20 Hertz to about 20 kHz.

24. The method of claim 8, wherein the activator is selected from a group consisting of sodium hydroxide, sodium carbonate, amine compounds, salts comprising calcium, sodium, magnesium, aluminum, and combinations thereof.

25. The method of claim 8, wherein the activator is selected from the group consisting of calcium chloride, calcium nitrite, calcium nitrate, sodium chloride, sodium aluminate, sodium silicate, magnesium chloride, and combinations thereof.

26. The method of claim 8, wherein the activator is selected from a group consisting of triethanol amine, tripropanol amine, tri-isopropanol amine, diethanol amine, and, and combinations thereof.

27. A method for setting a settable composition, comprising:
positioning the settable composition in a wellbore; and
transmitting a sonic signal in the settable composition to initiate setting using a mechanism directly responsive to the sonic signal, wherein the mechanism includes deactivation of a set retarder or activation of an activator configured to increase a setting rate of the settable composition.

28. The method of claim 27, wherein the settable composition comprises at least one of a cement composition, a resin composition, a settable mud, a conformance composition, or a lost circulation composition.

29. The method of claim 27, wherein the settable composition comprises a free-radical dopant that releases autocatalytic free radicals in response to the sonic signal.

30. The method of claim 29, wherein the settable composition includes a polymeric additive, the released autocatalytic free radicals initiate polymerization of at least a portion of the settable composition.

31. The method of claim 27, wherein the mechanism includes decreasing a particulate size in the cement slurry.

32. The method of claim 27, wherein the mechanism includes increasing at least one of pressure or temperature of the settable composition.

33. The method of claim 27, wherein the sonic signal is transmitted at a frequency in a range from about 20 Hertz to about 2 MHz.

34. The method of claim 27, further comprising determining a frequency for transmitting the sonic signal based, at least in part, on an inhibitor chemistry of the settable composition.

35. The method of claim 27, wherein the sonic signal is an ultrasonic signal.

36. The method of claim 35, wherein the ultrasonic signal is transmitted at a frequency in the range of from about 20 to about 2 MHz.

37. The method of claim 27, wherein the sonic signal is an acoustic signal.

38. The method of claim 37, wherein the acoustic signal is transmitted at a frequency in the range of from about 20 Hertz to about 20 kiloHertz.

* * * * *